United States Patent
Nonoyama

(10) Patent No.: US 8,566,872 B2
(45) Date of Patent: Oct. 22, 2013

(54) BROADCASTING SYSTEM AND PROGRAM CONTENTS DELIVERY SYSTEM

(75) Inventor: Kenji Nonoyama, Tokyo (JP)

(73) Assignee: Access Co., Ltd., Tokyo (JP)

( * ) Notice: Subject to any disclaimer, the term of this patent is extended or adjusted under 35 U.S.C. 154(b) by 1036 days.

(21) Appl. No.: 12/224,264

(22) PCT Filed: Feb. 22, 2007

(86) PCT No.: PCT/JP2007/053250
§ 371 (c)(1),
(2), (4) Date: Aug. 21, 2008

(87) PCT Pub. No.: WO2007/097387
PCT Pub. Date: Aug. 30, 2007

(65) Prior Publication Data
US 2009/0022476 A1    Jan. 22, 2009

(30) Foreign Application Priority Data

Feb. 22, 2006 (JP) .................... 2006-045265
Mar. 27, 2006 (JP) .................... 2006-085897
Jun. 15, 2006 (JP) .................... 2006-165536

(51) Int. Cl.
*H04N 5/445* (2011.01)
*H04N 7/173* (2011.01)
*H04N 9/80* (2006.01)

(52) U.S. Cl.
USPC ............. 725/40; 386/240; 386/241; 386/248; 725/112

(58) Field of Classification Search
None
See application file for complete search history.

(56) References Cited

U.S. PATENT DOCUMENTS

| | | | | |
|---|---|---|---|---|
| 5,961,603 A | * | 10/1999 | Kunkel et al. | 709/229 |
| 2003/0115601 A1 | * | 6/2003 | Palazzo et al. | 725/42 |
| 2004/0117839 A1 | | 6/2004 | Watson et al. | |
| 2004/0133923 A1 | | 7/2004 | Watson et al. | |
| 2006/0010467 A1 | * | 1/2006 | Segel | 725/34 |
| 2007/0186266 A1 | | 8/2007 | Watson et al. | |

FOREIGN PATENT DOCUMENTS

| | | |
|---|---|---|
| JP | 10-177532 | 6/1998 |
| JP | 11-004416 | 1/1999 |
| JP | 2002-108750 | 4/2002 |
| JP | 2004-104640 | 4/2004 |
| JP | 2005-286748 | 10/2005 |
| JP | 2005-323332 | 11/2005 |
| JP | 2005-537707 | 12/2005 |
| JP | 2006-345263 | 12/2006 |
| JP | 2006-350500 | 12/2006 |
| JP | 2007-028310 | 2/2007 |
| JP | 2007-028312 | 2/2007 |

OTHER PUBLICATIONS

International Search Report mailed May 1, 2007, for PCT Application No. PCT/JP2007/053250 filed Feb. 2, 2007, 8 pages.

* cited by examiner

*Primary Examiner* — David Garcia Cervetti
*Assistant Examiner* — Fatoumata Traore
(74) *Attorney, Agent, or Firm* — Morrison & Foerster LLP

(57) ABSTRACT

Provided is a summary management method including: a step for receiving a program signal providing a program, a step for acquiring a summary of a web content associated with the program together with the summary management information, and a step for managing the acquired summary according to the management information.

33 Claims, 22 Drawing Sheets

BROADCASTING SYSTEM AND PROGRAM CONTENTS DELIVERY SYSTEM

FIELD OF THE INVENTION

Figure 1:
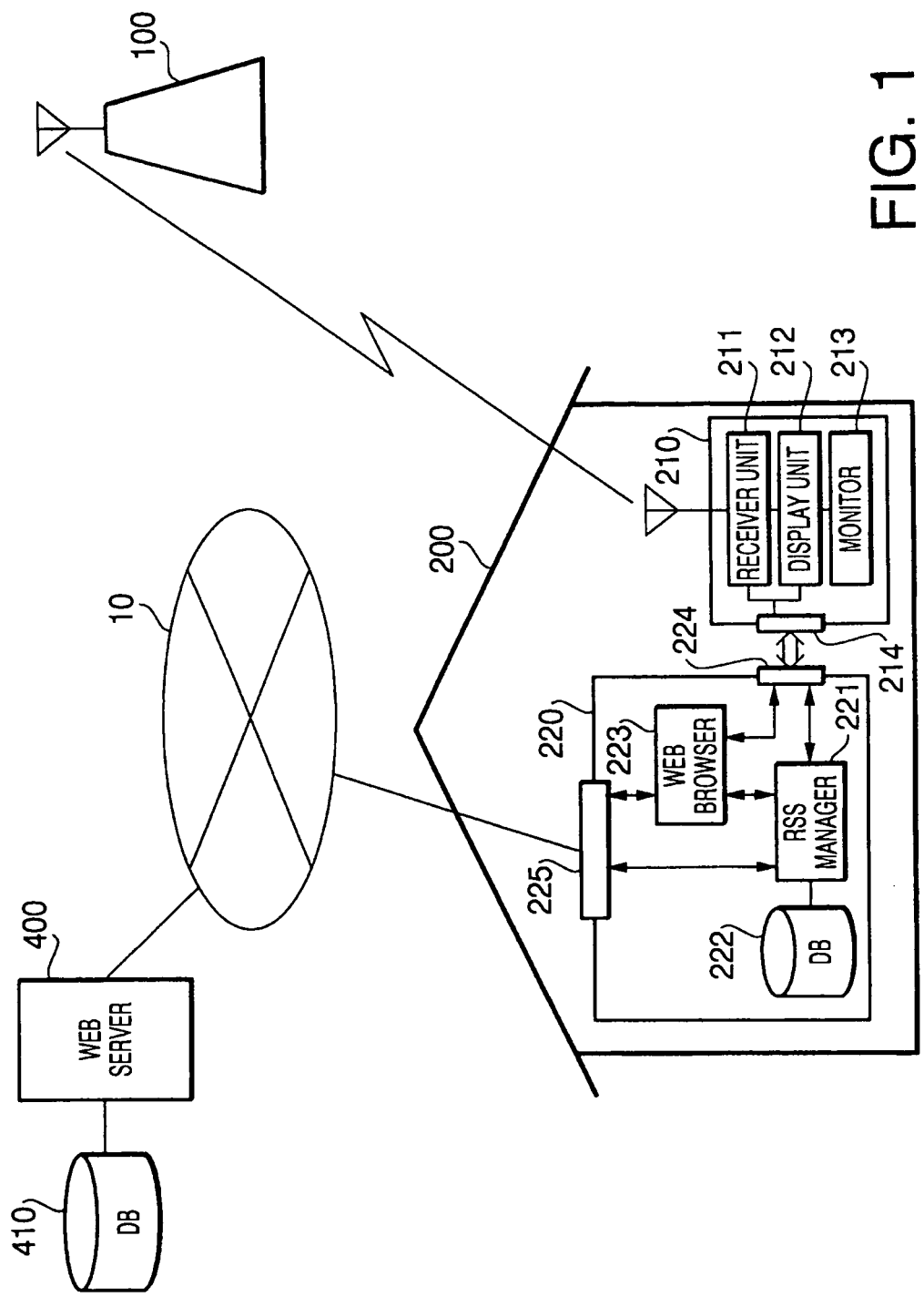

The present invention relates to a summarized information management device to manage summarized information of web pages which are related with broadcasted programs and a method to manage the summarized information.

BACKGROUND OF THE ART

Web pages which are related to broadcasted programs for television are provided to the public, and web pages set up by organizations and corporations who provide commercial messages can be found. Television viewers who are interested in the broadcasted programs and the commercial messages can search through the internet based on names of the programs and the corporations to find the web pages related to the programs and the commercials. Alternately, the viewers can record URLs (uniform Resource Locators) which are presented in the broadcasted programs to enter in browsers and browse the web pages related to the programs and the commercials.

A technique to easily access the web pages related to TV programs is disclosed in Japanese Patent Provisional Publication No. 2005-586748. In the publication, a television receiver capable of receiving internet address information of a web page superimposed on broadcasting signals and storing the address information in a storing means is disclosed. Further, Japanese Patent Provisional Publication No. 2004-104640 discloses a digital television receiver capable of obtaining data representing program names and internet addresses which are included in digitally-broadcasted television data and storing pairs of the name and the internet address in a storage.

According to the television receiver disclosed in the former publication, the viewers are required to judge as to whether the web contents represented by the internet address should be browsed based solely on the internet address. According to the television receiver disclosed in the latter publication, the name of the program and the internet address are presented as a pair, and the viewers are required to judge as to whether the web contents represented by the program name should be browsed based on the program name.

However, it is considered to be less likely that the viewers choose to browse the web contents without further knowledge concerning the web contents; thus, the stored addresses may have been underused.

DISCLOSURE OF THE INVENTION

According to an aspect of the present invention, there is provided a summarized information managing device, including a program signal receiver unit to receive program signals which provide a program, a summarized information obtaining unit to obtain summarized information of web contents which are associated with the program along with management information of the summarized information, and a summarized information management unit to manage the summarized information obtained by the summarized information obtaining unit according to the management information. The management information includes at least one of periods of validities concerning obtaining the summarized information, displaying the summarized information, a category of the summarized information, and accessibility to an address included in the summarized information.

According to an aspect of the present invention, there is provided a method to manage summarized information, including a step to receive program signals which provide a program, a step to obtain summarized information of web contents which are associated with the program along with management information of the summarized information, and a step to manage the summarized information according to the management information. The management information includes at least one of periods of validities concerning obtaining the summarized information, displaying the summarized information, a category of the summarized information, and accessibility to an address included in the summarized information.

According to another aspect of the present invention, there is provided a program list information usable device, including a program list information obtaining unit to obtain program list information, which is usable to view or record a program, and in which summarized information associated with the program is included, a summarized information obtaining unit to obtain the summarized information included in the program list information. The summarized information obtaining unit obtains the summarized information included in the program list information when the program list information, obtained by the program list information obtaining unit, is used to select the program to be viewed or recorded.

According to an aspect of the present invention, there is provided a method to record and reproduce program signals, including a step to receive program signals which provide a program, a step to obtain summarized information of web contents which are associated with the program, a step to obtain program specifying information to specify the program, a step to record the obtained program specifying information to be associated with the obtained summarized information and the received program signals, a step to display the summarized information and the program specifying information associated with the summarized information on a screen, and a step to extract the program signals specified by the program specifying information, when the user selects the program specifying information, from the recording unit and reproduce the extracted program signals.

According to an aspect of the present invention, there is provided a recording and reproducing device for program signals, including a program signal receiver unit to receive program signals which provide a program, a summarized information obtaining unit to obtain summarized information of web contents which are associated with the program, a program specifying information obtaining unit to obtain program specifying information which specifies the program, a recording unit to record the program specifying information obtained by the program specifying information obtaining unit to be associated with the summarized information obtained by the summarized information obtaining unit and the program signals received by the program signal receiver unit, a display unit to display the summarized information and the program specifying information associated with the summarized information on a screen, and a program signal reproduction unit to extract the program signals specified by the program specifying information, when the user selects the program specifying information, from the recording unit and reproduce the extracted program signals.

According to an aspect of the present invention, there is provided a recording and reproducing device for program signals, including a program signal receiver unit to receive program signals, on which summarized information address indicating an address of summarized information concerning web contents being associated with a program is superimposed, a summarized information address extracting unit to extract the summarized information address from the received program signals, a summarized information obtaining unit to access the extracted summarized information address to obtain the summarized information, a program specifying information obtaining unit to obtain program specifying information which specifies the program, a recording unit to record the obtained program specifying information to be associated with the obtained summarized information and the received program signals, a display unit to display the summarized information and the program specifying information associated with the summarized information on a screen, and a program signal reproduction unit to extract the program signals specified by the program specifying information, when the user selects the program specifying information, from the recording unit and reproduce the extracted program signals.

According to an aspect of the present invention, there is provided a recording and reproducing device for program signals, including a program signal receiver unit to receive program signals, on which attribute information concerning the program is superimposed, an attribute information extracting unit to extract the attribute information from the received program signals, a summarized information address obtaining unit to transmit the extracted attribute information to a database, in which the attribute information of the program and an address of the summarized information concerning web contents being associated with the program are stored to be associated with each other, and to obtain the summarized information address which indicates an address of the summarized information corresponding to the transmitted attribute information, a summarized information obtaining unit to access the obtained summarized information address to obtain the summarized information, a summarized information displaying unit to display the obtained summarized information, a program specifying information obtaining unit to obtain program specifying information which specifies the program, a recording unit to record the obtained program specifying information to be associated with the obtained summarized information and the received program signals, a display unit to display the summarized information and the program specifying information associated with the summarized information on a screen, and a program signal reproduction unit to extract the program signals specified by the program specifying information, when the user selects the program specifying information, from the recording unit and reproduce the extracted program signals.

According to an aspect of the present invention, there is provided a method to reproduce streaming program signals, including a step to receive streaming program signals which provide a program in stream, a step to obtain summarized information, in which an address to provide program signals of another program being related to the program is stored, a step to obtain program specifying information to specify the program, a step to display the obtained program specifying information on a screen, a step to access an address which provides streaming program signals of a program specified by the program specifying information based on the obtained summarized information, when the user selects the program specifying information, to reproduce the streaming program signals.

According to an aspect of the present invention, there is provided a receiver device for program signals, including a program signal receiver unit to receive program signals, on which summarized information address indicating an address of summarized information of web contents concerning a program is superimposed, a summarized information address extracting unit to extract the summarized information address from the received program signals, a summarized information obtaining unit to access the extracted summarized information address to obtain the summarized information, a summarized information display unit to display the obtained summarized information, a summarized information management unit, which manages the summarized information obtained by the summarized information obtaining unit based on at least one of a viewership achievement of an associated program associated with the program, a browsed achievement of the summarized information, and a browsed achievement of a web page at the address included in the summarized information.

According to an aspect of the present invention, there is provided a receiver device for program signals, including a program signal receiver unit to receive program signals, on which attribute information concerning the program is superimposed, an attribute information extracting unit to extract the attribute information from the received program signals, a summarized information address obtaining unit to transmit the extracted attribute information to a database, in which the attribute information of the program and an address of the summarized information concerning web contents being associated with the program are stored to be associated with each other, and to obtain the summarized information address which indicates an address of the summarized information corresponding to the transmitted attribute information, a summarized information obtaining unit to access the obtained summarized information address to obtain the summarized information, a summarized information displaying unit to display the obtained summarized information, and a summarized information management unit, which manages the summarized information obtained by the summarized information obtaining unit based on at least one of a viewership achievement of an associated program associated with the program, a browsed achievement of the summarized information, and a browsed achievement of a web page at the address included in the summarized information.

According to an aspect of the present invention, there is provided a reproduction device for streaming program signals, including a streaming program signal receiver unit to receive streaming program signals which provide a program in stream, a summarized information obtaining unit to access a summarized information address, which indicates a location of summarized information, to obtain the summarized information, in which an address to provide program signals of another program being related to the program is stored, a summarized information address extracting unit to extract the summarized information address, which is superimposed over the received streaming program signals, from the streaming program signals, a program specifying information obtaining unit to obtain program specifying information to specify the program, a display unit to display the obtained program specifying information on a screen, and a reproduction unit to access an address which provides streaming program signals of a program specified by the program specifying information based on the summarized information obtained by the summarized information obtaining unit, when the user selects the program specifying information, to reproduce the specified streaming program signals.

According to an aspect of the present invention, there is provided a reproduction device for streaming program signals, including a streaming program signal receiver unit to receive streaming program signals which provide a program in stream, a program specifying information extracting unit to extract program specifying information, which specifies the program and is superimposed over the streaming program signals, from the streaming program signals, a summarized information address obtaining unit to transmit the extracted program specifying information to a database, in which the program specifying information and an address of summarized information concerning web contents being associated with the program are stored to be associated with each other, and to obtain the summarized information address which indicates an address of the summarized information corresponding to the transmitted program specifying information, a summarized information obtaining unit to access the obtained summarized information address to obtain the summarized information, a display unit to display the extracted program specifying information on a screen, and a reproduction unit to access an address which provides streaming program signals of a program specified by the program specifying information based on the obtained summarized information, when the user selects the program specifying information being displayed, to reproduce the specified streaming program signals.

According to an aspect of the present invention, there is provided a program signal exchanging system, including a program signal transmitter device to transmit program signals to provide a program and a program signal receiver device to receive the program signals. The program signal exchanging system uses any of the above-described devices and methods.

BRIEF DESCRIPTION OF ACCOMPANYING DRAWINGS

[FIG. 1] A diagram to illustrate a configuration of a digital broadcasting system according to an embodiment of the present invention.

Figure 2:
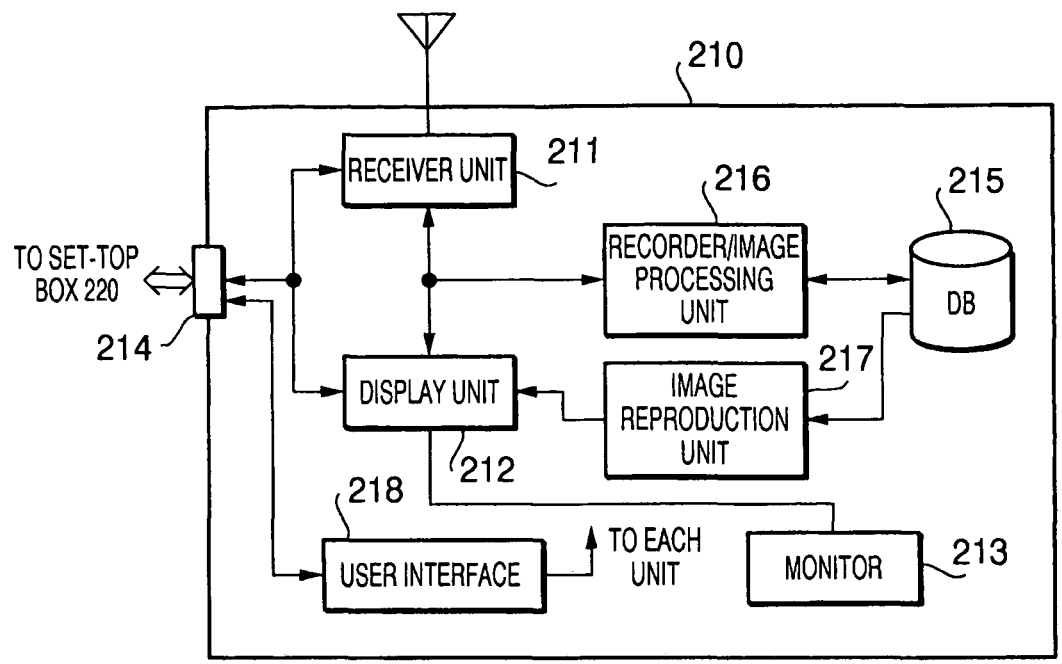

[FIG. 2] A diagram to illustrate a detailed configuration of a television according to the embodiment of the present invention.

Figure 3:
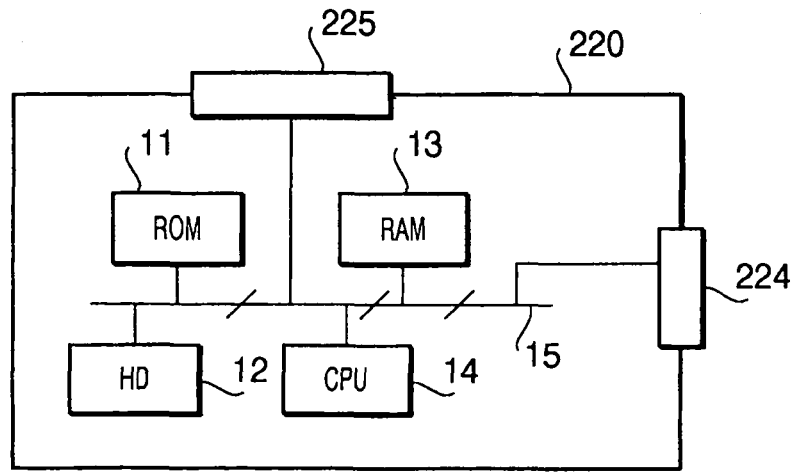

[FIG. 3] A diagram to illustrate a hardware configuration of a set-top box according to the embodiment of the present invention.

Figure 4:
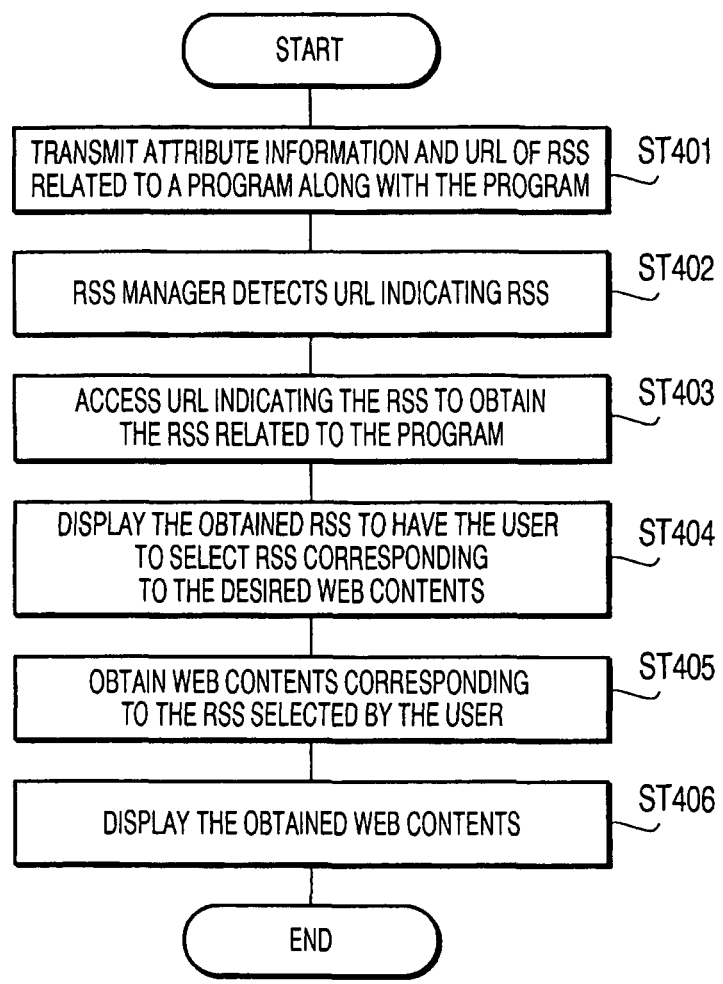

[FIG. 4] A flowchart to illustrate behaviors of the digital broadcasting system shown in FIG. 1.

Figure 5:
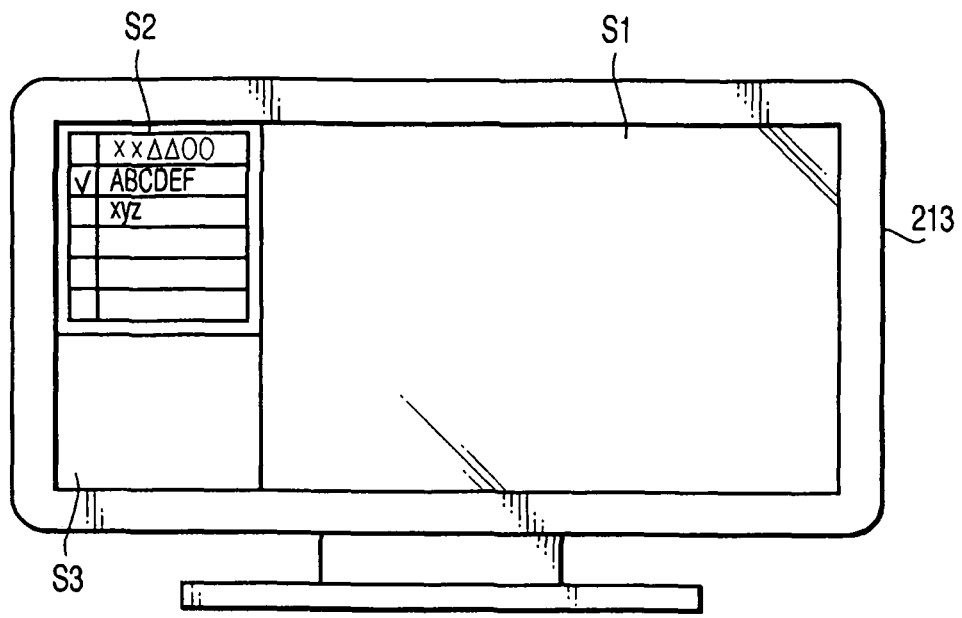

[FIG. 5] A diagram to illustrate contents of obtained RSS being displayed on a monitor according to the embodiment of the present invention.

Figure 6:
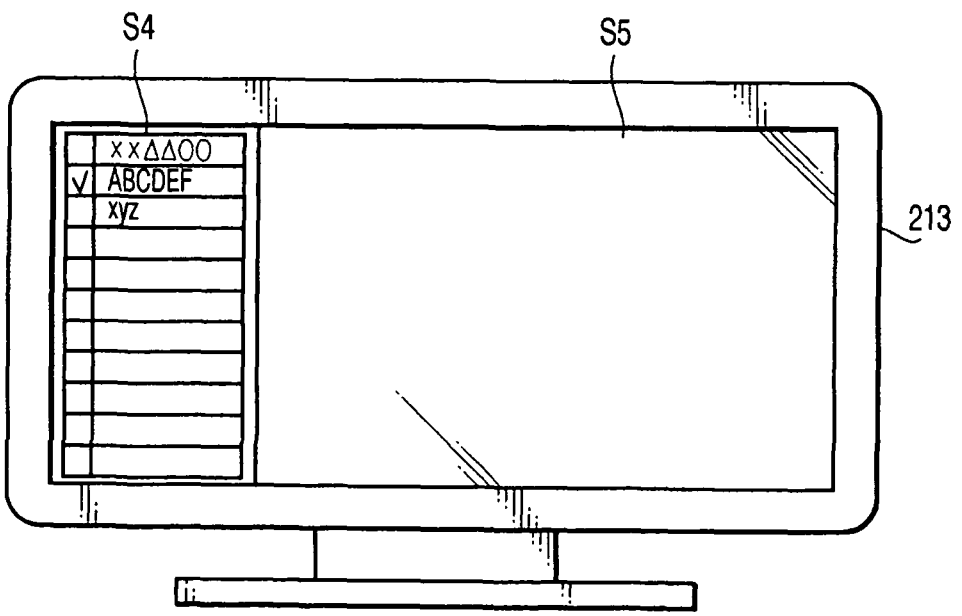

[FIG. 6] A diagram to illustrate the monitor with a screen to be displayed according to the embodiment of the present invention when contents of the RSS are designated to obtain web contents after a program is viewed.

Figure 7:
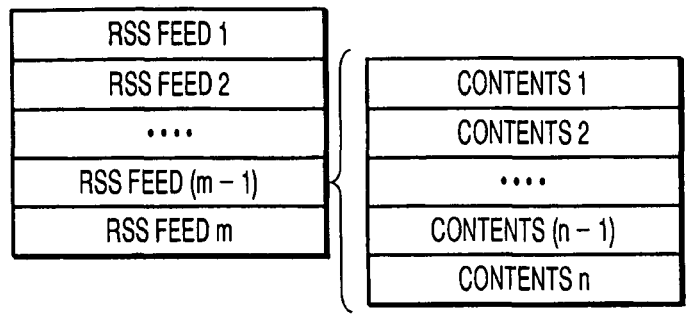

[FIG. 7] A diagram to illustrate a relation between RSS feeds and web contents to be stored in a database according to the embodiment of the present invention.

Figure 8:
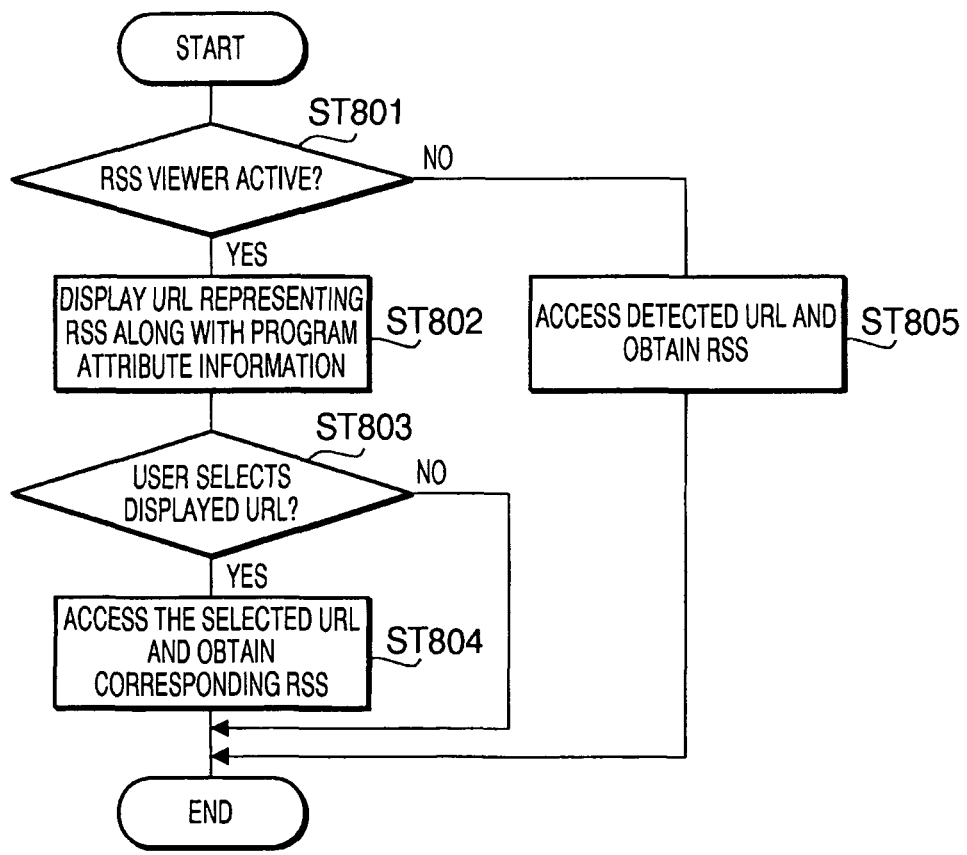

[FIG. 8] A flowchart to illustrate behaviors when a user selects a URL of the RSS according to the embodiment of the present invention.

Figure 9:
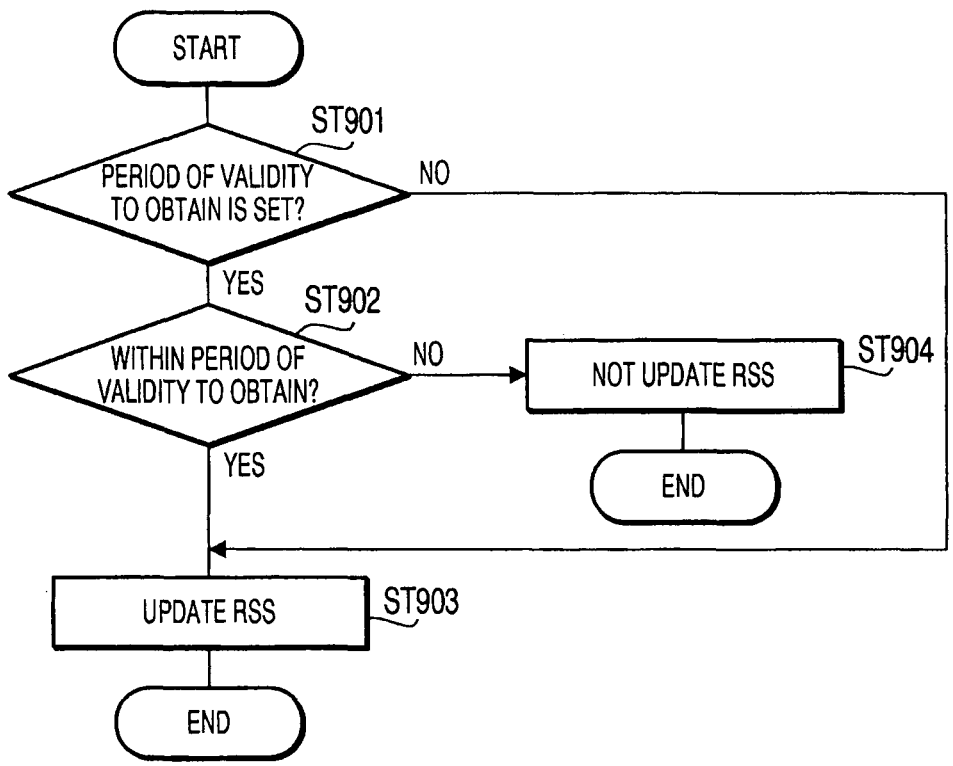

[FIG. 9] A flowchart to illustrate a process to periodically update the RSS to be executed by an RSS manager according to the embodiment of the present invention.

Figure 10:
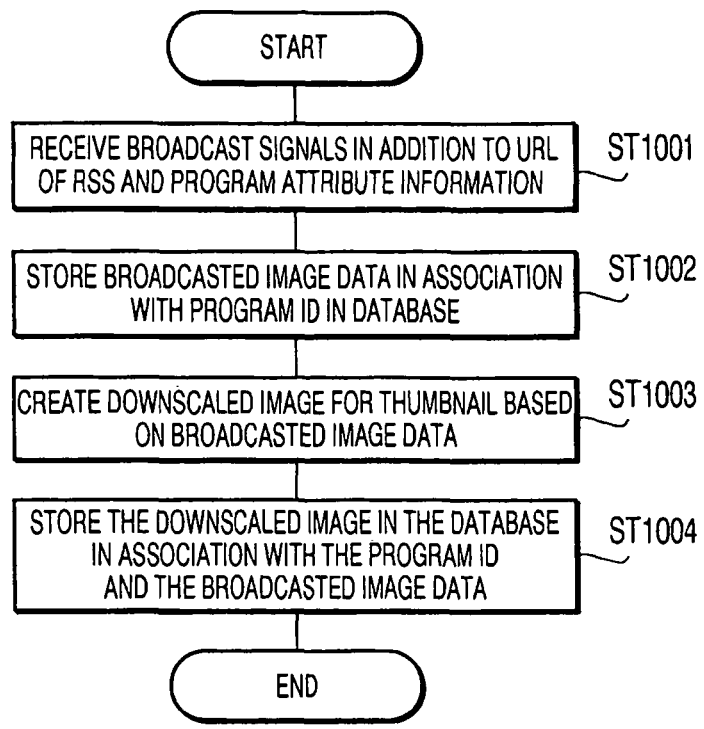

[FIG. 10] A flowchart to illustrate behaviors when the television records broadcasted signals transmitted from a broadcasting station.

Figure 11:
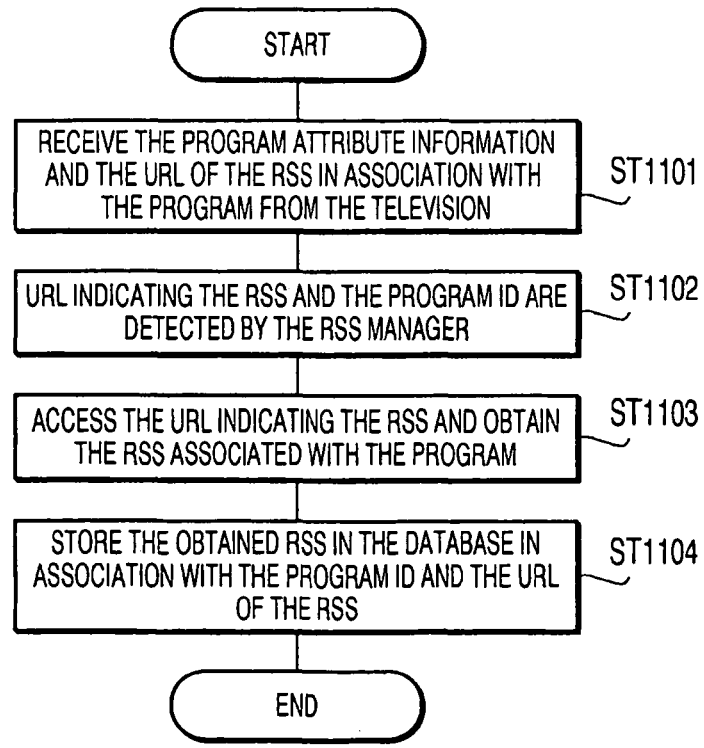

[FIG. 11] A flowchart to illustrate behaviors to obtain the RSS through the set-top box according to the embodiment of the present invention.

Figure 12:
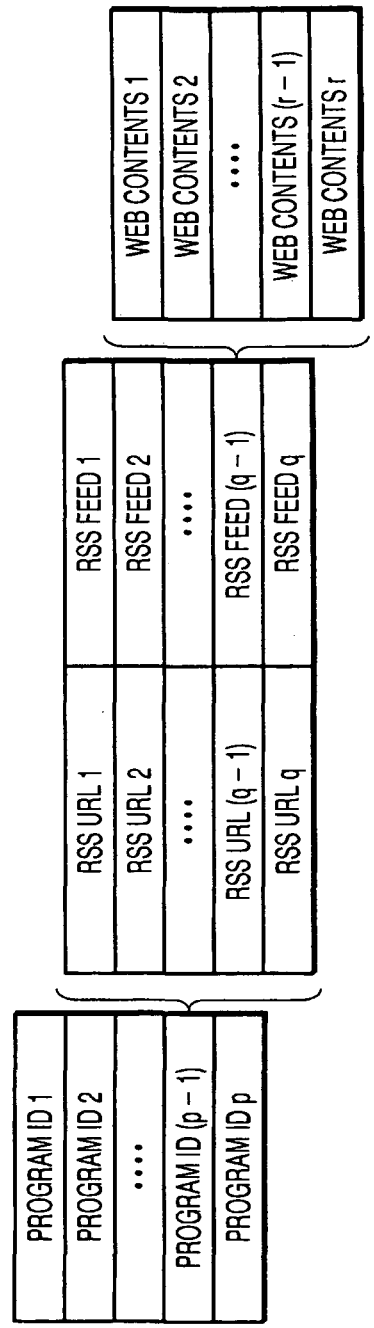

[FIG. 12] A diagram to illustrate a data structure to be stored in a database in the set-top box according to the embodiment of the present invention.

Figure 13:
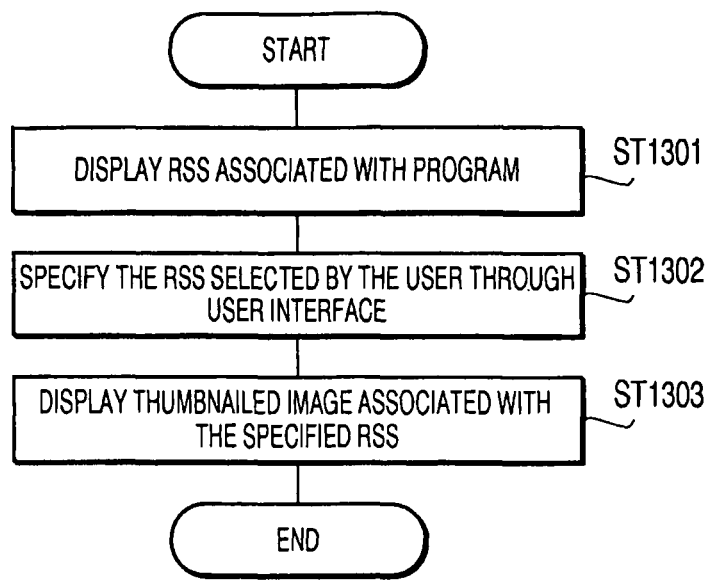

[FIG. 13] A flowchart to illustrate behaviors to be performed by the television to reproduce a recorded program according to the embodiment of the present invention.

Figure 14:
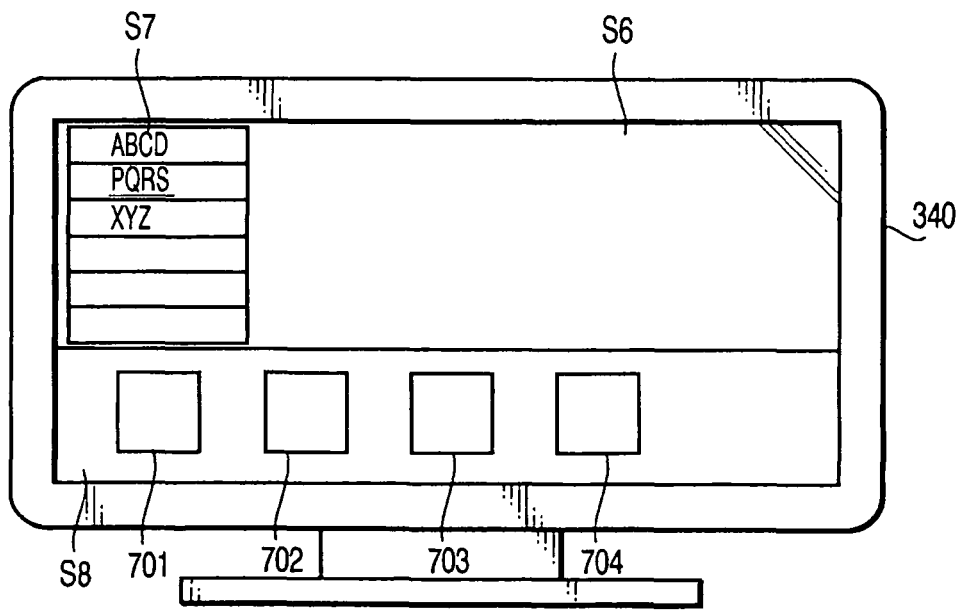

[FIG. 14] A diagram to illustrate the monitor with a screen to be displayed when the recorded program is reproduced by the television according to the embodiment of the present invention.

Figure 15:
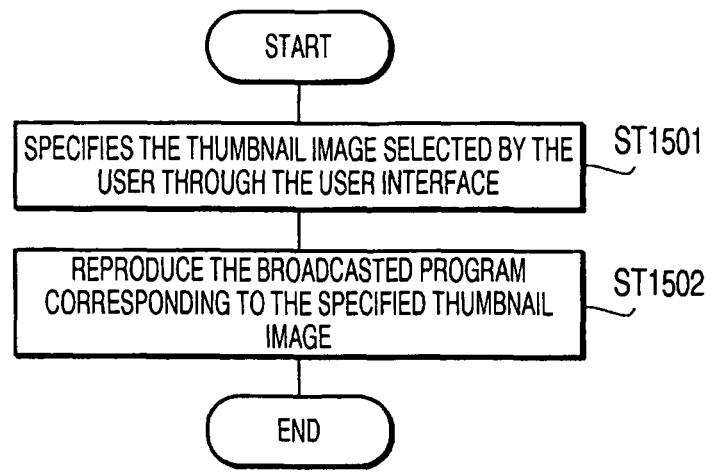

[FIG. 15] A is a flowchart to illustrate behaviors to select reproducing a recorded program by selecting a thumbnail according to the embodiment of the present invention.

Figure 16:
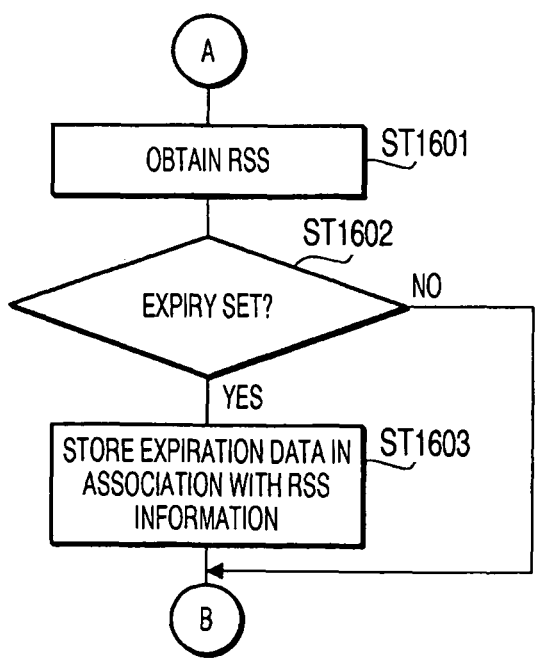

[FIG. 16] A flowchart to illustrate behaviors in an expiring process to be performed by an RSS manager when the RSS is obtained according to the embodiment of the present invention.

Figure 17:
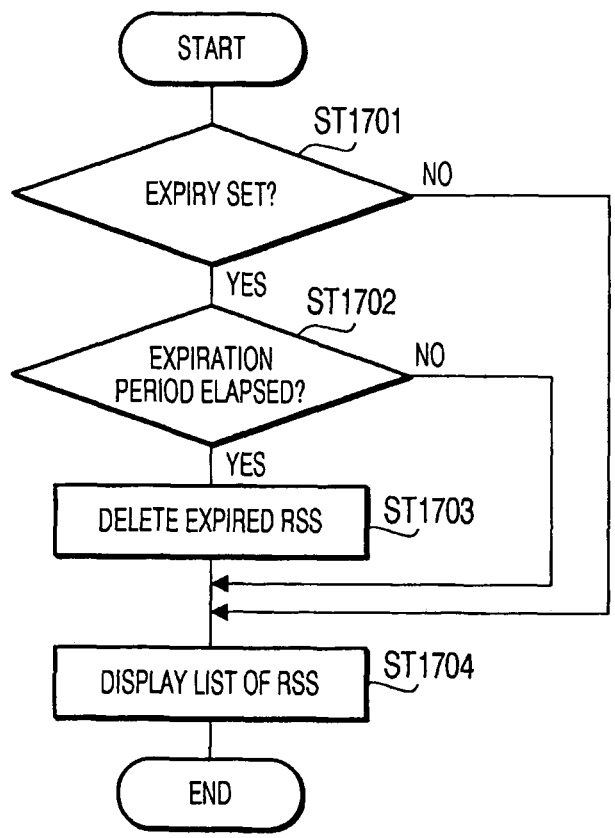

[FIG. 17] A flowchart to illustrate the expiring process to be executed by the RSS manager 221 when an RSS viewer is activated according to the embodiment of the present invention.

Figure 18:
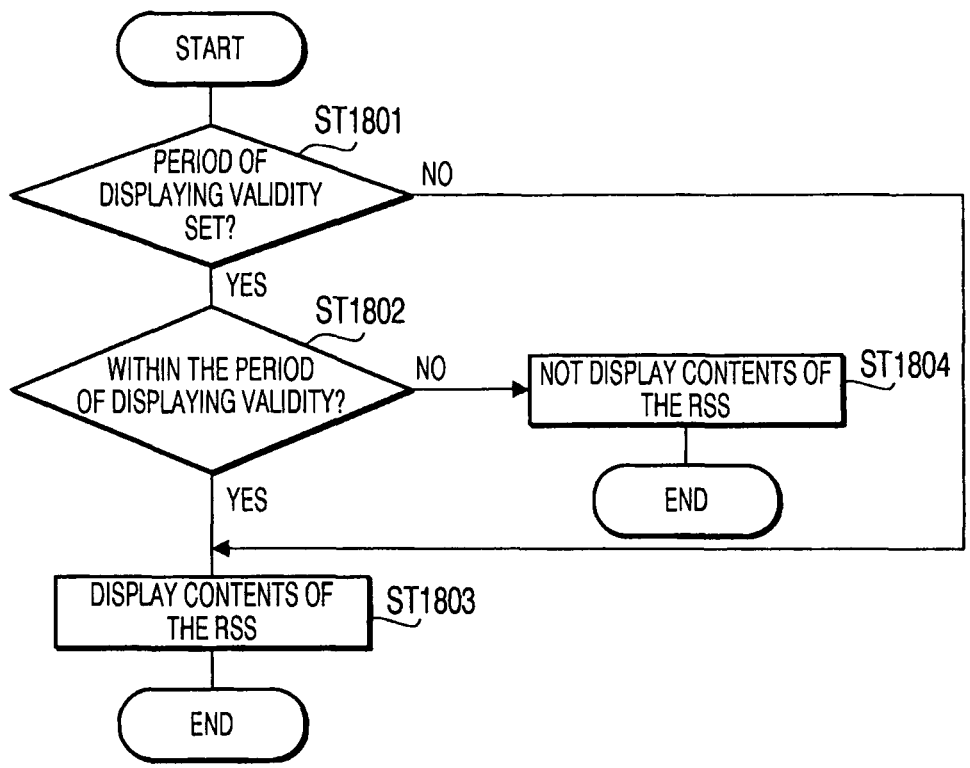

[FIG. 18] A flowchart to illustrate behaviors of the RSS manager to process a period of displaying validity according to the embodiment of the present invention.

Figure 19:
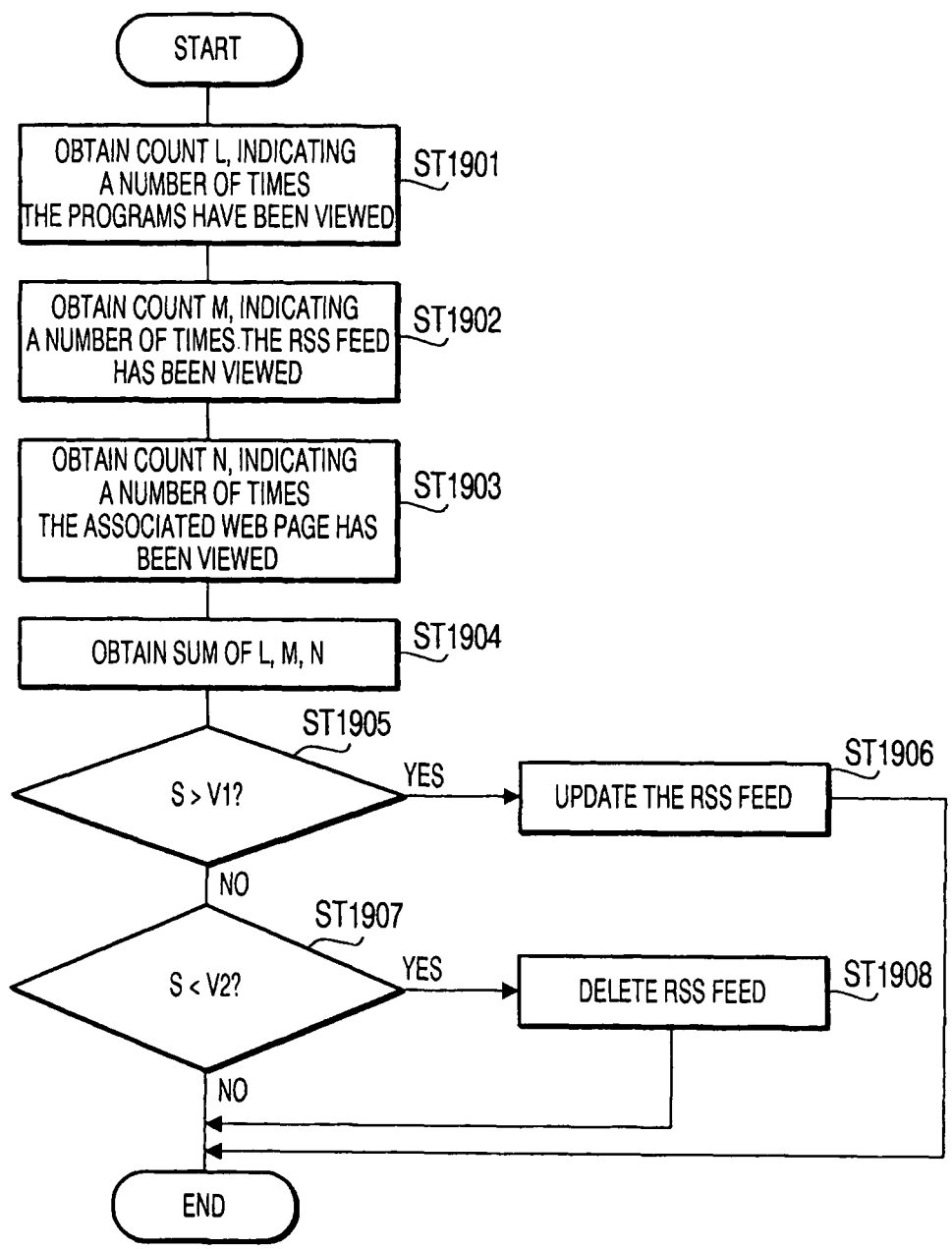

[FIG. 19] A flowchart to illustrate behaviors in an updating/deleting process based on viewed counts of the programs, the RSS feeds, and the web pages according to the embodiment of the present invention.

Figure 20:
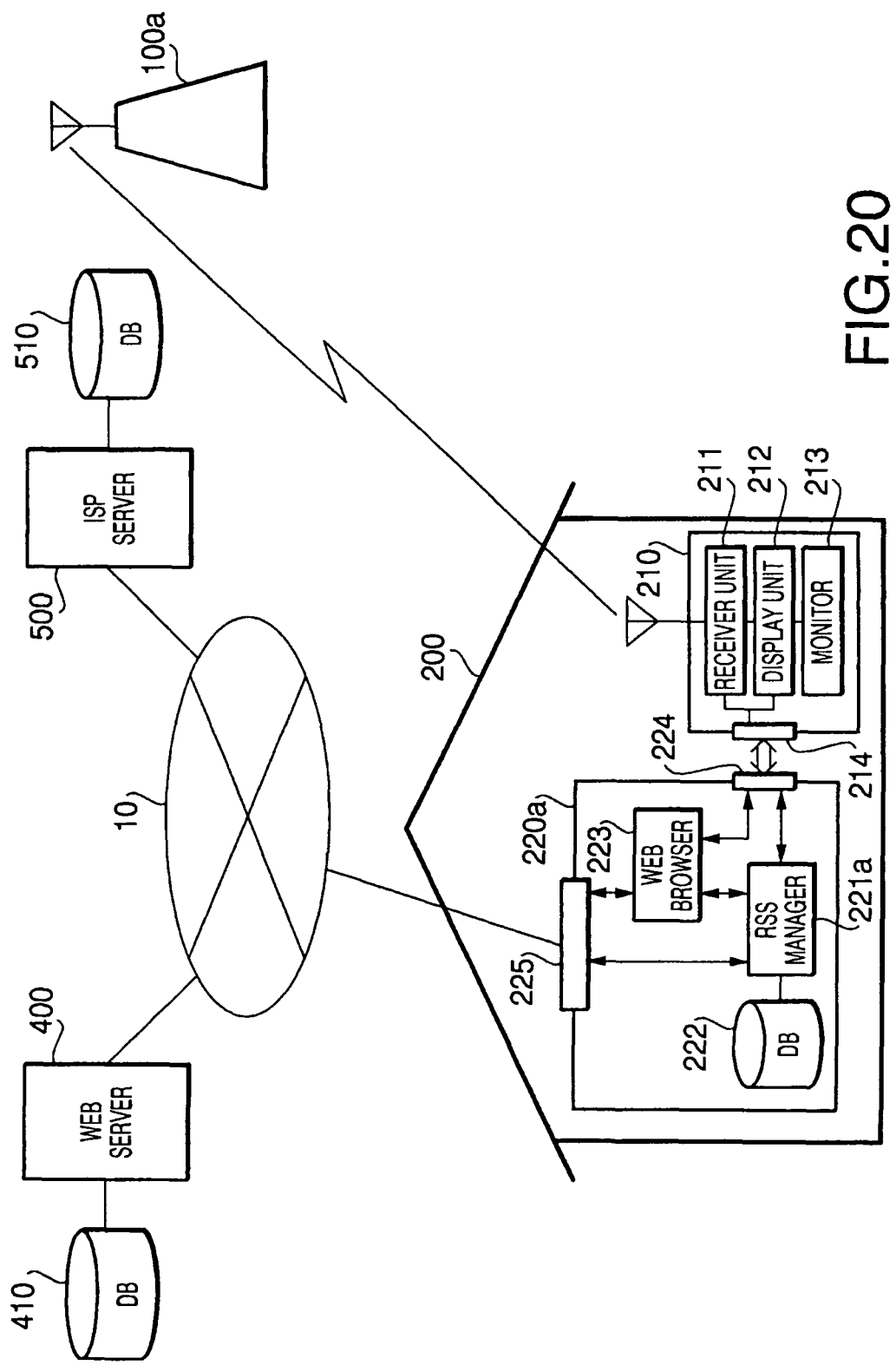

[FIG. 20] A diagram to illustrate a configuration of a digital broadcasting system according to an embodiment of the present invention.

Figure 21:
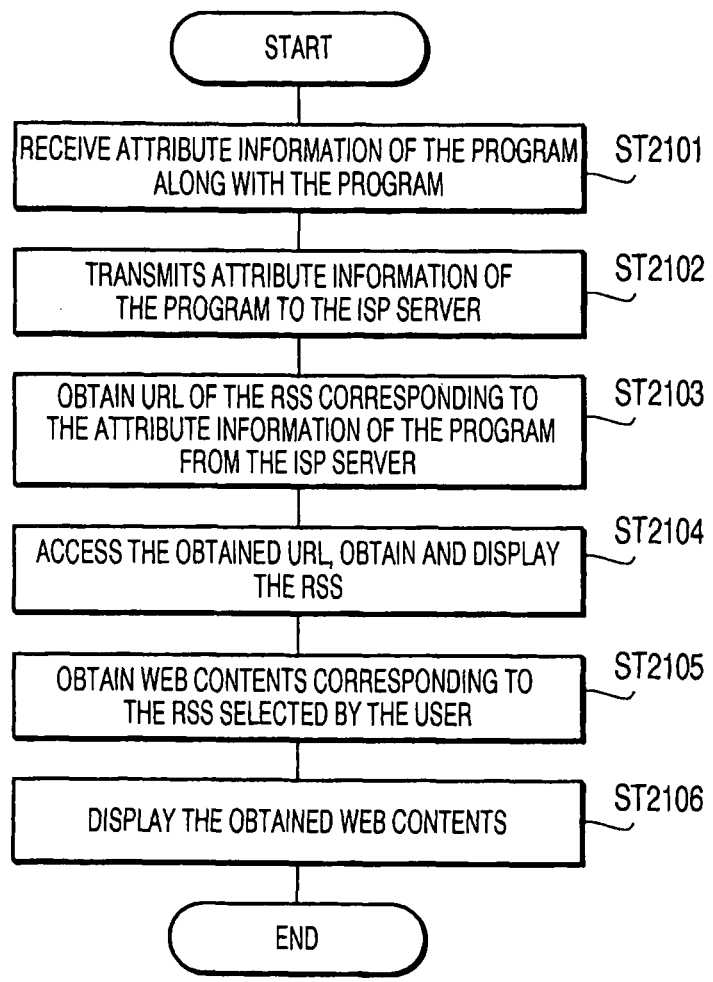

[FIG. 21] A flowchart to illustrate behaviors of the digital broadcasting system in the configuration shown in FIG. 20.

Figure 22:
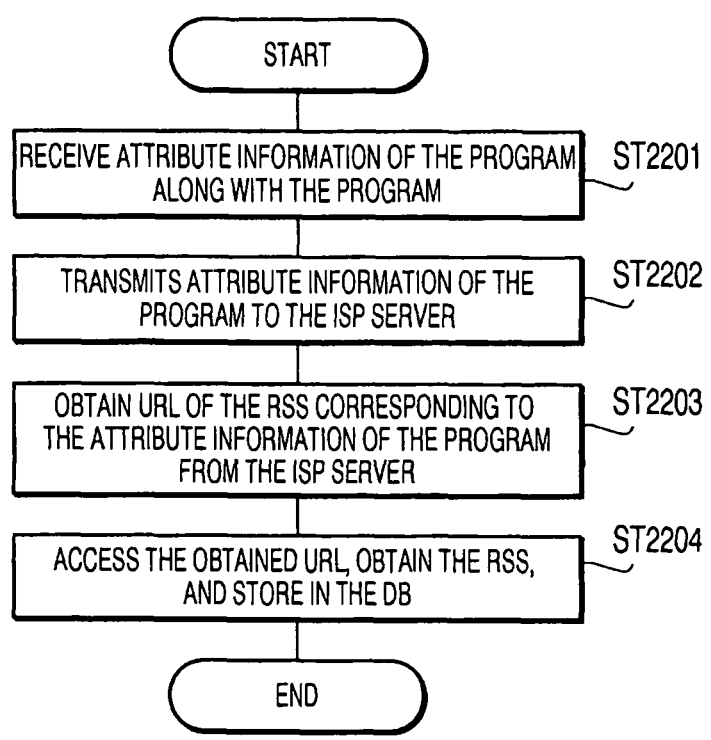

[FIG. 22] A flowchart to illustrate behaviors of the set-top box and the television in the digital broadcasting system in the configuration shown in FIG. 20.

Figure 23:
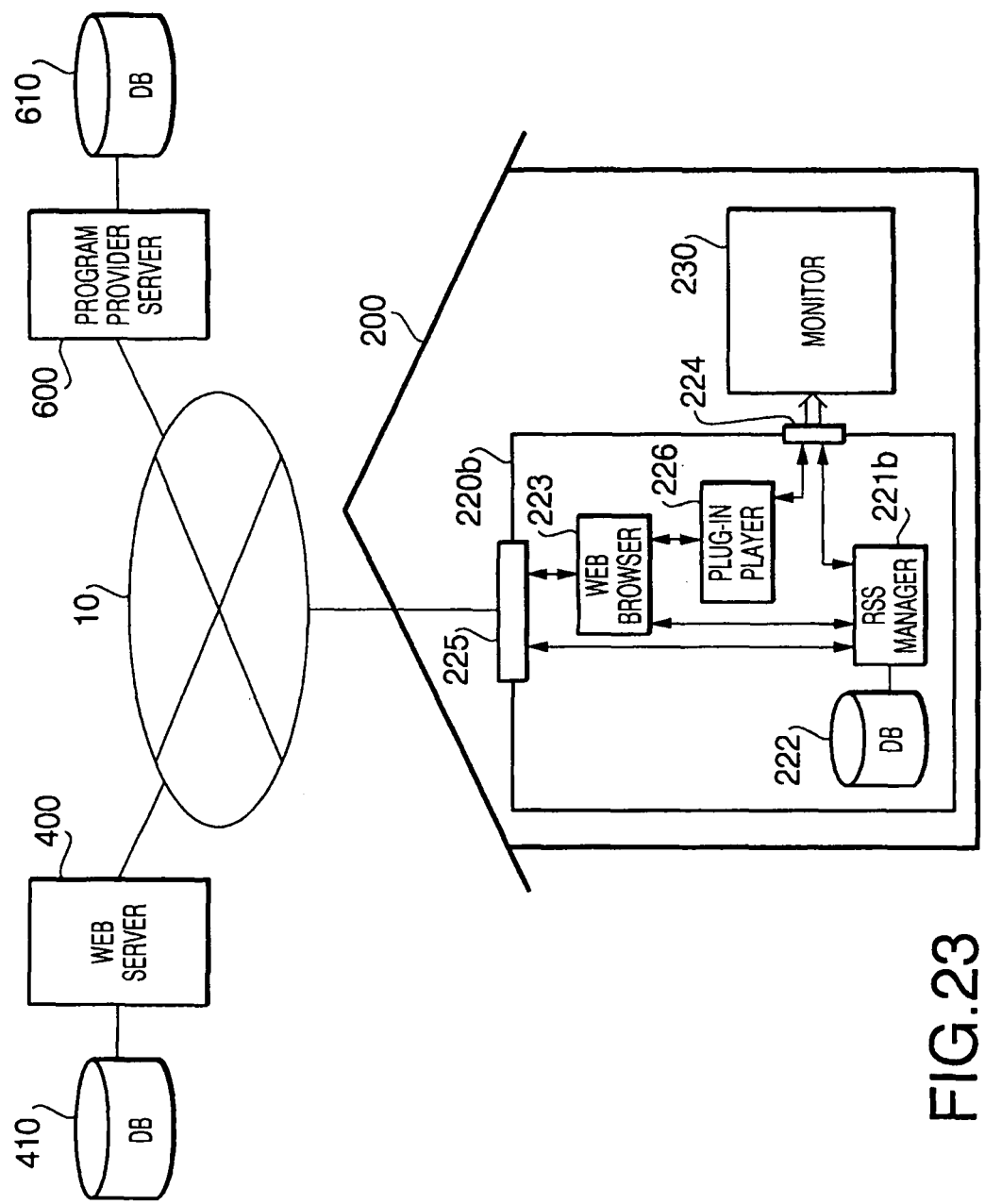

[FIG. 23] A diagram to illustrate a configuration of a program contents delivery system according to the embodiment of the present invention.

Figure 24:
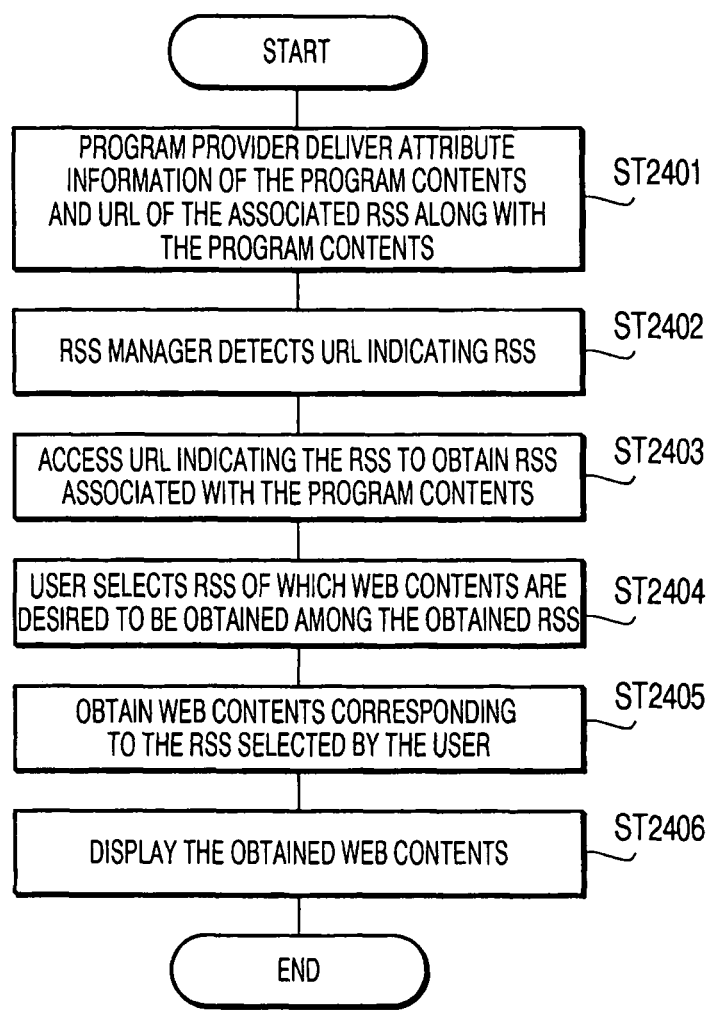

[FIG. 24] A flowchart to illustrate behaviors of the contents delivery system shown in FIG. 23 according to the embodiment of the present invention.

Figure 25:
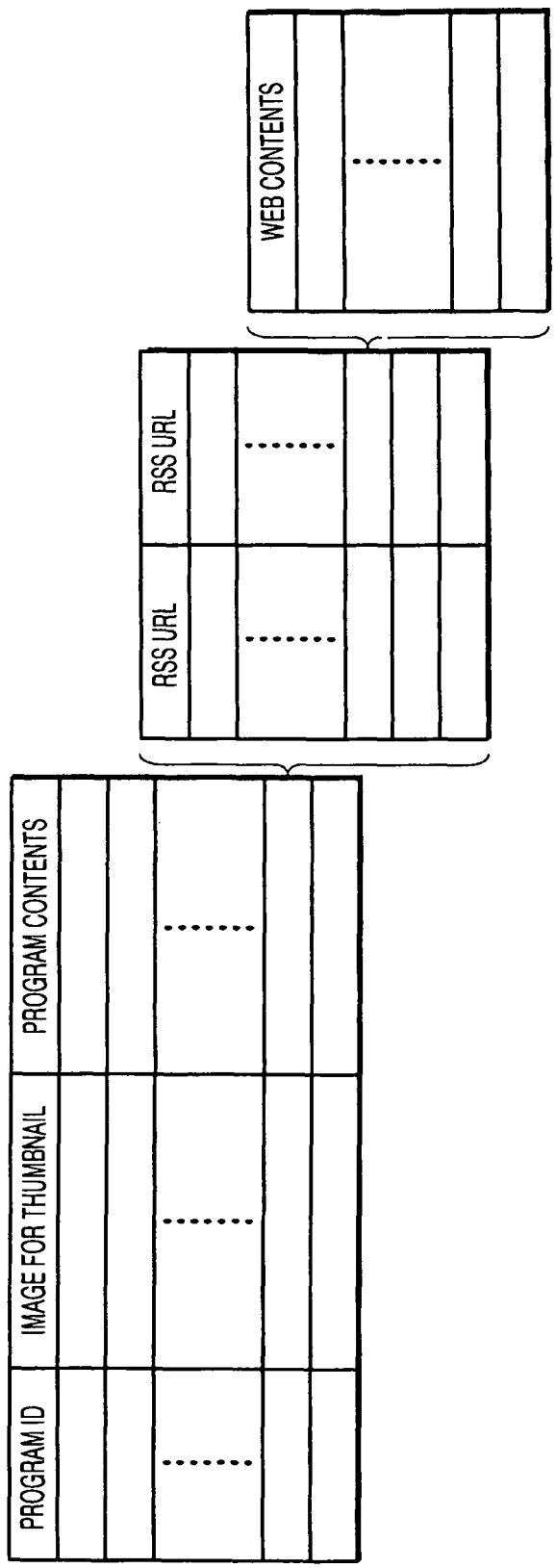

[FIG. 25] A diagram to illustrate a data structure of a database in a contents receiver device shown in FIG. 23.

Figure 26:
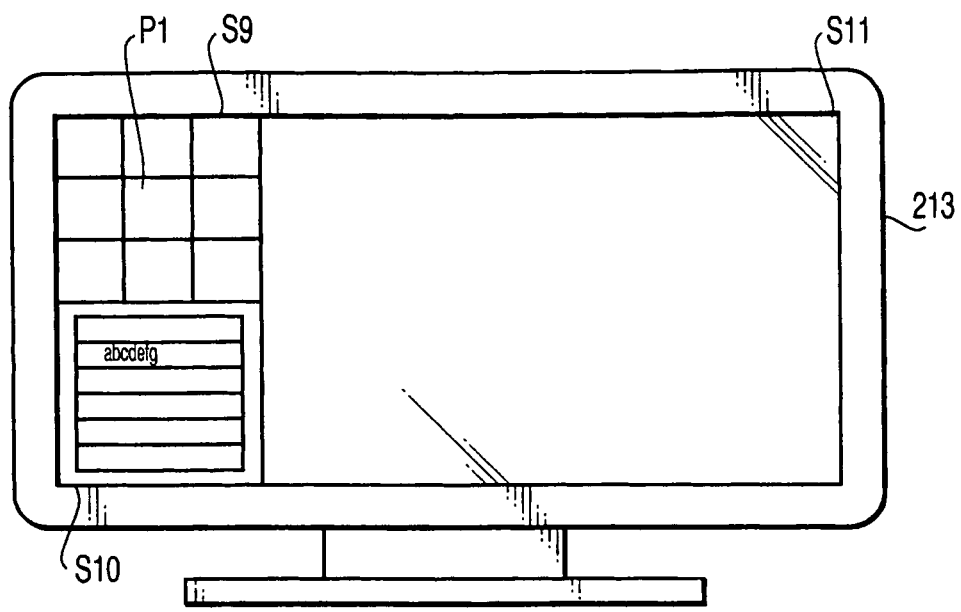

[FIG. 26] A diagram to illustrate a screen to be displayed when the RSS is included in EPG information according to the embodiment of the present invention.

Figure 27:
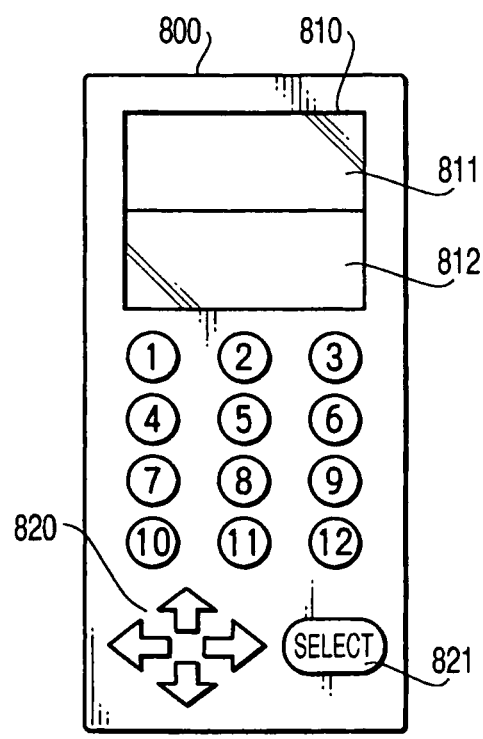

[FIG. 27] A diagram to illustrate an external view of a remote controller according to the embodiment of the present invention.

Figure 28:
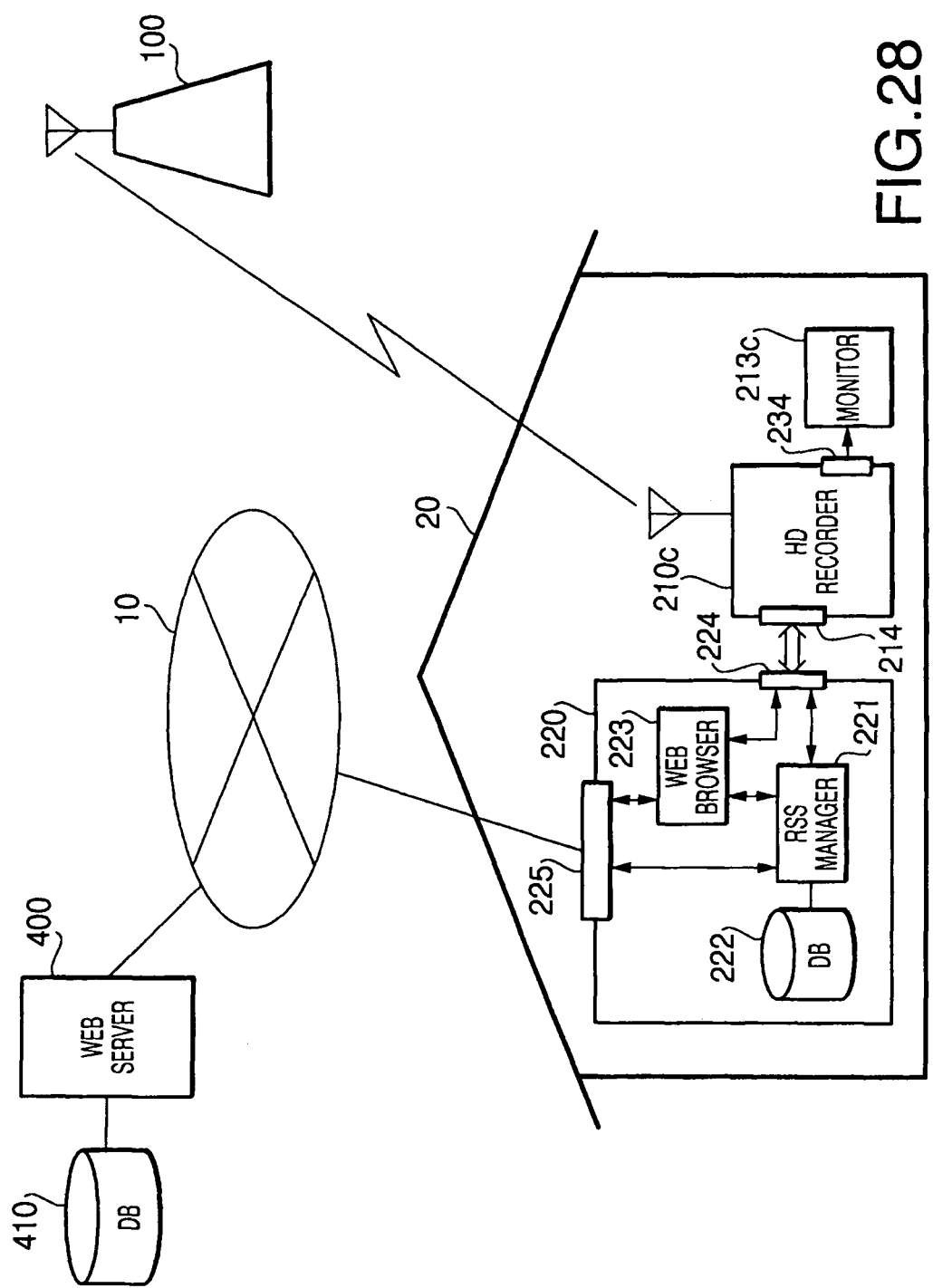

[FIG. 28] A diagram to illustrate a configuration of a digital broadcasting system according to an embodiment of the present invention.

Figure 29:
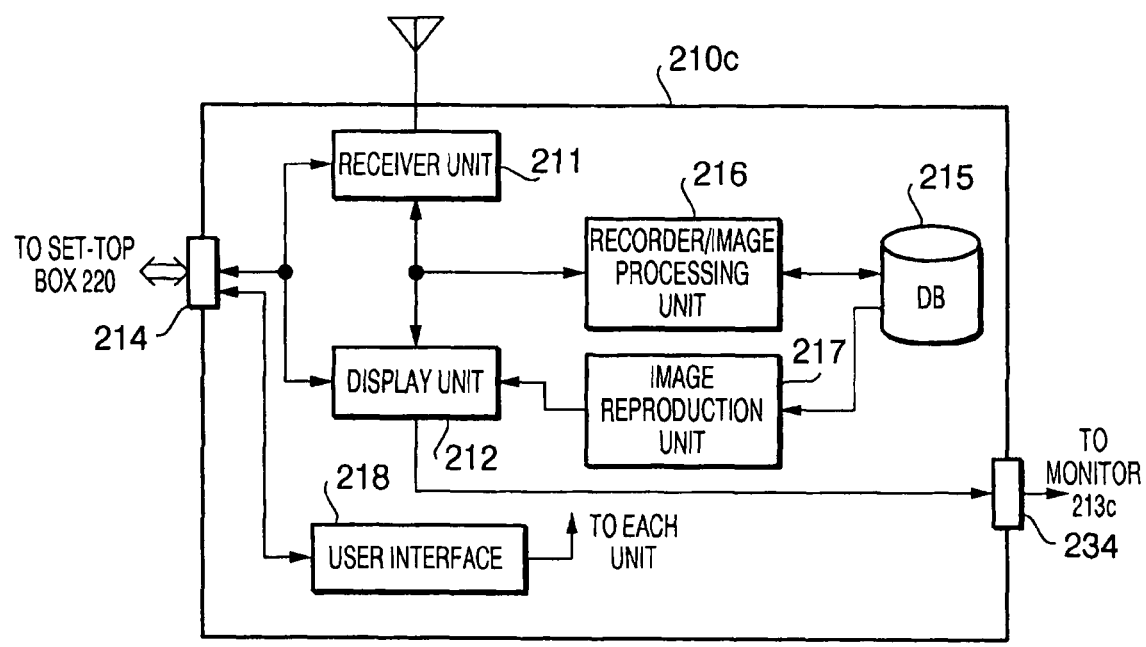

[FIG. 29] A diagram to illustrate a detailed configuration of an HD recorder shown in FIG. 28 according to the embodiment.

EXPLANATION OF REFERENCE NUMERALS 10 internet
100, 100a broadcasting stations
210 television
211 receiver unit
212 display unit
213 monitor
215 database
216 recorder/image processing unit
217 image reproduction unit
218 user interface
220, 220a set-top boxes
220b contents receiver device
221, 221a, 221b RSS managers
222 database 223 web browser
226 plug-in player
230 monitor
400 web server
410 database
500 ISP server
510 database
600 program provider server
610 database
700 remote controller

DETAILED DESCRIPTION OF PREFERRED EMBODIMENTS

A broadcasting system according to an aspect of the present invention will be described with reference to the drawings.

FIG. 1 is a diagram to illustrate a configuration of the digital broadcasting system according to an embodiment of the present invention. In FIG. 1, notation 100 refers to a broadcasting station to modulate video data, audio data, and other data and transmit the modulated signals over carrier waves, which are radio waves at a predetermined frequency.

The broadcasting station 100 transmits multiplexed data which represents information concerning news, weather reports, etc., as well as video and audio signals for broadcasted programs. Further, URLs (Uniform Resource Locators) to indicate locations in which summarized information concerning websites for the programs are stored are multiplexed as well to be transmitted. The summarized information concerning websites is information which is also referred to as RSS (RDF (resource description framework) Site Summary) being metadata to describe outlines of the websites. The outlines of the websites include, for example, information concerning updated contents in the web pages.

Thus, the broadcasting station 100 broadcasts programs and transmits data including attribute information concerning the programs (e.g., names of the programs, information concerning channels, broadcasting dates) and URLs in which the RSS for the websites related to the programs multiplexed into the broadcasting signals. The websites related to the programs in the present embodiment include websites provided by sponsors of the programs as well as the websites dedicated for the programs.

A residence 200 is equipped with a television 210 to receive digital broadcast signals and a set-top box 220, which is attached to the television 210 and connected to the internet 10, to obtain the RSS information of the websites and web contents through the internet 10.

The set-top box 220 includes an RSS manager 221, which extracts a URL representing RSS transmitted from the broadcasting station 100 and collects summarized information of the websites represented by the URL, a database 222 to store the URL extracted by the RSS manager 221, and a web browser 223 to obtain the contents of the web pages represented by the URL being obtained by the RSS manager 221. Further, notation 224 refers to an interface through which electric signals are exchanged between the television 210 and the set-top box 220. Notation 225 refers to an adaptor to connect the set-top box 220 30 with the internet.

Notation 400 refers to a web server being related to the programs and connected to the internet. The contents of the websites being related to the programs and the RSS being the summarized information of the websites are stored in a database 410.

FIG. 2 is a diagram to illustrate a detailed configuration of a television 210. The television 210 is provided with a receiver unit 211, a display unit 212, a monitor 213, and an interface 214. The receiver unit 211 receives broadcast signals broadcasted by the broadcasting station 100. The display unit 212 dissociates the video signals from the broadcast signals received by the receiver unit 211 and generates signals to display on a screen. Further, the display unit 212 includes a BML (Broadcast Markup Language) viewer to display textual information included in the broadcast signals such as weather news and other news. The monitor 213 displays audio signals output from the receiver unit 212. The interface 214 exchanges electric signals with the set-top box 220. Further, the television 210 has a database 215, a recorder/image processing unit 216, and image reproduction unit 217 for recording and reproducing the programs. The database 215 stores data representing broadcasted images to be recorded. The recorder/image processing unit 216 records the broadcasted image data, which is received by the receiver unit 211, in the database 215, and generates downscaled images for displaying in thumbnails based on the recorded broadcasted image data to record the generated downscaled images again in the database 215. The display unit 212 further includes a function to display the broadcasted images recorded in the database 215 and the thumbnail images on the monitor 213. Furthermore, the television 210 has a user interface 218 which transmits operation signals to the units in the television 210 according to button/cursor operations given by the user to a remote controller.

In FIG. 1, a functional configuration of the set-top box 220 is illustrated. FIG. 3 is a diagram to illustrate a hardware configuration of the set-top box 220. As shown in FIG. 3, the set-top box 220 is provided with a ROM (Read Only Memory) 11, an HD (Hard Disk) 12, a RAM (Random Access Memory) 13, and a CPU (Central Processing Unit) 14. In the ROM 11, a boot program, and the like, is stored, and in the HD 12, programs such as the RSS manager 221 and the web browser 223. Further, in the HD 12, a database for the RSS and the web contents is configured. The RAM 13 can be used as a work area when the programs are activated, and the CPU 14 executes the program developed in the RAM 13. Furthermore, the ROM 11, the HD 12, the RAM 13, and the CPU 14 are mutually electrically connected by a bus 15. The web browser 223 and the RSS manager 221 are read out from the HD 12 upon startup and loaded in the RAM 13 to be executed. The web browser 223 and the RSS manager 221 may be stored in the ROM 11 rather than in the HD 12.

FIG. 4 is a flowchart to illustrate behaviors in the digital broadcasting system to browse web contents which are related to a program being viewed. The behaviors of the digital broadcasting system in the above-described configuration will be described with reference to the flowchart.

First, the broadcasting station 100 broadcasts broadcast signals, including video and audio which configures the program, with multiplexed program attribute information concerning the channel information of the program and a URL of RSS of web contents being related to the program (ST401). The program attribute information includes a program ID which identifies the broadcast program. In the present embodiment, the program ID is used in a process to record the program, which will be described later. The receiver unit 211 of the television 210 in the resident 200 receives the broadcast signals, and the display unit 212 extracts the video of the program out of the received signals to display on the monitor 213. Further, the signals received by the receiver unit 211 are transmitted to the set-top box 220 through the interface 214. The received signals are further passed to the set-top box 220 through the interface 224, and the RSS manager 221 detects a URL of the RSS in the received signals (ST402). Next, the television 210 accesses the database 410 in the web server 400 which corresponds to the URL to obtain the RSS (ST403). The obtained RSS is reserved in the database 222. Thereafter, the television 210 displays the obtained RSS so that the RSS of the desired web contents is selected (ST404). In other words, the RSS manager 221 instructs the display unit 212 to display contents of the obtained RSS on the monitor 213. Accordingly, a user selects RSS corresponding to the desired contents based on the contents of the displayed RSS. The RSS manager 221 instructs the web browser 223 to access the URL of the contents corresponding to the contents of the RSS selected by the user to obtain the web contents (ST405). The obtained web contents are stored in the database 222 in association 25 with the RSS and displayed on a screen of the monitor (ST406).

Thus, the RSS being summarized information of the web contents are displayed. Therefore, the user can easily determine as to whether the web contents are necessary or not.

FIG. 5 is a diagram to illustrate the contents of the obtained RSS being displayed on the monitor. As shown in FIG. 5, a display area of the monitor 213 is divided into three screens S1, S2, S3. On the screen S1, video of the program is displayed. On the screen S2, contents of the obtained RSS are listed. On the screen S3, the web contents corresponding to the contents of the RSS displayed on the screen S2. In other words, the contents of the RSS related to the program being displayed on the screen S1 are listed to be displayed on the screen S2. When the user selects contents of the RSS through the remote controller and the like, the web contents corresponding to the contents of the selected RSS are displayed on the screen S3. The RSS may not be displayed in a list, but may be in a ticker style, in which the contents are serially displayed in a line.

In the above-described embodiment, a configuration in which the web contents are obtained according to designation of the contents of the RSS while the program is being viewed was described. However, it may be configured such that the web contents are obtained according to designation of the contents of the RSS and browsed after the user finishes viewing the program.

FIG. 6 is a diagram to illustrate the monitor 213 with the screen to be displayed in such a configuration. As shown in FIG. 6, the display area is divided into two screens S4 and S5. On the screen S4, the contents of the RSS being stored in the database 222 are listed so that the user can select therefrom. On the screen S5, the web contents corresponding to the contents of the RSS selected in the screen S4 are displayed.

FIG. 7 is a diagram to illustrate a relation between RSS feeds (i.e., the contents of the RSS) and web contents to be stored in the database 222. In FIG. 7, a number of the RSS feeds is assumed to be m, while an RSS feed (m−1) includes n URLs of the web contents. Each URL included in the RSS feed (m−1) is corresponded to a piece of web contents in one-on-one basis.

In the above-described embodiment, when the RSS manager 221 detects a URL representing the RSS in the broadcast signals, the RSS manager 221 accesses the URL to obtain the RSS related to the program. However, the user may select a URL of the RSS included in the broadcast signals, and the RSS manager 221 may obtain the RSS corresponding to the selected URL.

FIG. 8 is a flowchart to illustrate such behaviors when the user selects the URL of the RSS to be obtained. As shown in FIG. 8, when the RSS viewer is activated (ST801: YES), the URL representing the RSS is displayed on the screen of the monitor 213 along with the program attribute information (ST802). When the user selects the displayed URL through the remote controller and the like (ST803: YES), the television 210 accesses the selected URL to obtain the RSS corresponding to the URL (ST804). When the URL is not selected (ST803: NO), the corresponding RSS is not obtained. When the RSS viewer is not active (ST801: NO), the television 210 accesses the URL which is detected without the user's selection and obtains the RSS (ST805). The obtained RSS is stored in the database 222.

The obtained RSS is periodically updated. FIG. 9 is a flowchart to illustrate a process to update the RSS to be executed by the RSS manager 221. As shown in FIG. 9, when a period of validity to obtain the RSS is not set (ST901: NO), the RSS is updated, and an RSS feed is obtained (ST903). When the RSS is updated, and the period of validity to obtain the RSS is set (S901: YES), and when it is within the period of validity to obtain the RSS (ST902: YES), the RSS is updated, and a new RSS feed is obtained (ST903). When the period of validity to obtain the RSS is set (ST901: YES), and the period of validity has elapsed (ST902: NO), the RSS feed is not updated (ST904), and the operation is terminated.

Next, a case in which the broadcast signals are recorded by a recording function of the television 210 in the above configuration will be described. FIG. 10 is a flowchart to illustrate behaviors to be performed when the television 210 records broadcast signals transmitted from the broadcasting station 100. The recording operation of the television 210 will be described with reference to the flowchart.

First, the receiver unit 211 of the television 210 receives the broadcast signals along with the program attribute information and the URL indicating the RSS superimposed over the broadcast signals (ST1001). Accordingly, the receiver unit 211 passes a program ID included in the program attribute information along with the image data of the broadcasted program to the recorder/image processing unit 216. The recorder/image processing unit 216 stores the program ID in the database 215 in association with the broadcasted image data (ST1002). Next, the receiver/image processing unit 216 creates downscaled images for displaying in thumbnails based on the broadcasted image data being stored in the database 215 (ST1003). Further, the recorder/image processing unit 216 stores the downscaled image in the database 215 in association with the program ID and the broadcasted image data (ST1004).

It is to be noted that the program ID may not necessarily be numerical identification, but may be a title of the broadcasted program, as long as the ID identifies the program. Further, the program ID may not be the information provided by the broadcasting station 100, but information which is equivalent to the program ID may be generated in the television 210 and assigned to each program.

FIG. 11 is a flowchart to illustrate behaviors to obtain the RSS through the set-top box 220. The behaviors of the set-top box 220 to obtain the RSS will be described with reference to the flowchart.

The RSS manager 221 receives the program attribute information and the URL indicating the associated RSS, which were received by the television 210, from the television 210 (ST1101). That is, the program attribute information and the URL indicating the associated RSS in association with the program attribute information are passed from the receiver unit 211 of the television 210 through the interface 214, 224 to the RSS manager 221 (ST1101). Accordingly, the RSS manager 221 detects the URL indicating the RSS and the program ID included in the program attribute information, which are superimposed over the broadcasted signals (ST1102). Next, the RSS manager 221 accesses the detected URL indicating the RSS to obtain the RSS associated with the broadcasted program (ST1103). Next, the RSS manager 221 stores the obtained RSS in the database 222 in association with the program ID and the URL indicating the RSS (ST1104).

FIG. 12 is a diagram to illustrate a data structure to be stored in the database 222. Unlike the data structure shown in FIG. 7, in which the broadcasted program is viewed but not recorded, the structure includes program IDs, by which a plurality of recorded programs are managed, and URLs indicating the RSS associated with the programs and by which the RSS is updated when the broadcasted program is reproduced. That is, a program ID (p−1) is associated with a plurality of URLs respectively indicating the associated RSS, and each of the URLs is associated with the corresponding RSS feed (i.e., contents of the RSS). Further, one of the RSS feeds is associated with web contents represented by the URL included in the RSS feed. A method to store the web contents associated with the RSS feed will be described later. The data structure shown in FIG. 12 may be used instead of the data structure shown in FIG. 7 even when the broadcasted program is not recorded but viewed.

FIG. 13 is a flowchart to illustrate behaviors to be performed by the television 210 to reproduce the recorded program, and FIG. 14 is a diagram to illustrate the monitor 213 with the displayed screen when the recorded program is reproduced by the television 210.

First, when the television 210 performs to reproduce, the image reproduction unit 21 passes the broadcasted image data in the database 215 to the display unit 212, and the display unit 212 displays images on the screen S6 of the monitor 213. The image reproduction unit 217 passes a program ID to identify a program to be reproduced in the database 215 to the display unit 212, and the display unit 212 passes the program ID to the RSS manager 221. The RSS manager 221 returns the RSS corresponding to the program ID in the database 222 to the display unit 212, and the display unit 212 displays a title of the RSS corresponding to the program on the screen S7 of the monitor 213 (ST1301). In the example shown in FIG. 14, three titles of the RSS, "ABCD," "PQRS," and "XYZ" are displayed. When the user selects the RSS with the title "PQRS" through the user interface 218, the "PQRS" is highlighted (ST1302), and a downscaled image associated with the RSS is displayed in a thumbnail on the screen S8 (ST1303). Therefore, the RSS manager 221 transmits the program ID associated with the RSS having the title "PQRS" to the television 210, and the image reproduction unit 217 transmits the downscaled imaged for displaying the thumbnails corresponding to the program ID in the database 215 to the display unit 212. The display unit 212 displays the downscaled images 701, 702, 703, 704 on the screen S8 of the monitor 213. In the example shown in FIG. 14, it is to be noted that the RSS having the title "PQRS" is associated with four programs.

The RSS manager 221 may be configured to display a list of RSS of recorded programs when the program being broadcasted on air is displayed as well as when the contents of the program recorded in the television 210 is being reproduced. That is, with the program being currently broadcasted being displayed on the screen S6, rather than the recorded program, when the user's instruction to display the list of RSS of the recorded program is given, the RSS manager 221 is activated to display the list including the titles of the RSS of the recorded program on the screen S7, and to display the thumbnail images of the program associated with the RSS on the screen S8.

When the user selects desired RSS, the television 210 may access the URL included in the RSS and display the web contents on the entire screen S6 or on a part of the screen S6. In this configuration, the RSS manager 221 instructs the web browser 223 to access the URL included in the RSS, and the web browser 223 accesses the web server 400 corresponding to the URL through the internet 10 to obtain the web contents stored in the database 410, and the obtained web contents are passed to the display unit 212. The display unit 212 displays the web contents on the entire screen S6 or on a part of the screen S6.

Further, the RSS manager 221 associates the web contents obtained from the web server 400 with the RSS feed as shown in FIG. 12 and stores in the database 222.

FIG. 15 is a flowchart to illustrate behaviors to select reproducing a recorded program by selecting a thumbnail.

The user determines a desired program to view based on the downscaled images displayed on the screen S8 shown in FIG. 14, and the downscaled image selected by the user is specified by the user interface 218 (ST1501). Accordingly, the broadcasted image data corresponding to the specified downscaled image is read out from the database 215 by the image reproduction unit 217 and passed to the display unit 12. The display unit 212 displays the broadcasted image data on the screen S6 of the monitor 213 (ST1502). For example, when the downscaled image 701 in FIG. 14 is selected, the broadcasted image data associated with the downscaled image 701 is read out from the database 215 and reproduced on the screen S6.

Thus, the user can select the broadcasted and recorded program based on the RSS feed to reproduce.

Next, a case in which expiry is set to the RSS will be described. The expiry is an instruction to delete the RSS from the database after a predetermined period elapses, and the RSS is set the period of expiration.

FIG. 16 is flowchart to illustrate behaviors in an expiring process to be performed by the RSS manager 221 when the RSS is obtained. It is to be noted that the process between A and B in FIG. 16 is replaced with ST403 shown in FIG. 4 or ST1103 shown in FIG. 11. As shown in FIG. 16, after the RSS manager 221 obtains the URL indicating the RSS from the broadcasting station 100, the RSS manager 221 accesses the URL and obtains the corresponding RSS (ST1601). When expiry is set (ST1602), expiration data, which is information concerning time of deletion, and the contents of the RSS are associated with each other and stored in the database 222 (ST1603).

FIG. 17 is a flowchart to illustrate the expiring process to be executed by the RSS manager 221 when the RSS viewer is activated. As shown in FIG. 17, first, when the expiry is set in the RSS (ST1701: YES), it is examined as to whether the expiration period has elapsed. When the expiration period has elapsed (ST1702: YES), the expired RSS and the web contents associated with the RSS are deleted from the database 222 (ST1703). If the expiration period has not elapsed (ST1702: NO), the RSS is not deleted from the database 222. Thereafter, the RSS excluding the deleted RSS is displayed (ST1704).

In ST1703, the expired RSS and the web contents associated with the RSS are deleted from the database 222; however, the data may not necessarily be deleted, but may be displayed when an application of the RSS viewer is independently used. Meanwhile, the data may not be displayed when the associated program is reproduced. In other words, the expiry to limit a period in which a predetermined program can be displayed may be set in the RSS.

In the above-described embodiment, the expiry set in the RSS was described; however, the expiry to limit an obtainable period to obtain the RSS may be set in an address representing the RSS. In this configuration, the expiry is set in the address of the RSS, and the obtainable period has elapsed, the RSS cannot be obtained even when the RSS manager 221 instructs to obtain the RSS. Further, the expiry to limit an updatable period of the RSS may be set in the address of the RSS. In this configuration, the RSS cannot be updated even when the RSS manager 221 instructs to update the RSS.

It is to be noted that, when the user instructs to delete the broadcasted image data in the database 215 of the television 210 through the user interface 218, the recorder/image processing unit 216 deletes the images for thumbnail display as well. Further, the URL indicating the RSS in the database 222 of the set-top box 220 and the RSS feeds may be deleted depending on a mode setting. In this configuration, the RSS feeds associated with the program can be collectively deleted, and the RSS feeds can be easily managed by the user.

Next, timing to obtain the RSS when the images are recorded by the television 210 in the embodiment shown in FIG. 1 will be described. In this case, the television 210 is enabled to access the URL of the RSS to obtain the RSS when broadcasted signals are received, i.e., when the television 210 is recording, so that the timely-appropriate RSS which is synchronized with the broadcasted program can be obtained. However, concerning programs in which immediacy is required, such as news programs, the RSS may be obtained during reproduction. The timing to obtain the RSS may be configured by the user in the television 210. Alternately, data to instruct the timing to obtain the RSS may be included in the broadcasting signals from the broadcasting station 100 along with the URL of the RSS.

Thus, when the display unit 210 records and reproduces, and the RSS is obtained during the reproduction, the linkage information indicating the RSS which was included in the broadcasting signals during the recording may not be included during the reproduction. In such a case, the obtainable expiration period to obtain the RSS feed as described above can be set, or the RSS can be deleted according to the expiry, so that redundant operation to obtain the RSS can be omitted, and the RSS can be effectively managed.

It is to be noted, however, the RSS may not necessarily be deleted based on the expiry, as described above, but the RSS may be set a period of displaying validity.

FIG. 18 is a flowchart to illustrate behaviors of the RSS manager 221 to process the period of displaying validity. As shown in FIG. 18, first, when the period of displaying validity is set (ST1801: YES), and when it is within the period of validity (ST1802: YES), the RSS manager 221 displays the contents of the RSS (ST1803). When the period of displaying validity is not set (ST1801: NO), the contents of the RSS is displayed as well (ST1803). Meanwhile, when the period of displaying validity is set (ST1801: YES), and when the period has elapsed (ST1802: NO), the contents of the RSS are not displayed (ST1804), and the process is terminated. According to the flow, unlike the expiry setting, the RSS is not deleted, the contents of the RSS can be displayed to be viewed afterwards by altering the configuration of the RSS viewer, etc.

Further, a period of validity to access each URL included in the RSS can be set in the RSS. For example, the RSS includes a channel component, which indicates fundamental information of the RSS, and an itemizing component, which specifically describes a resource listed in an index in the channel component. A period of validity to access a URL included in each component can be independently set so that fine setting of the period of validity can be achieved. More specifically, in case of RSS for a series of programs, a URL included in a channel component indicates a URL of a top page of a web site of a program series, while a URL included in an itemizing component indicates a URL concerning one show in the series. Meanwhile, in case of RSS of a single broadcasted program, a URL included in a channel component indicates a URL of a top page of the web site provided by the broadcasting station, and a URL of an itemizing component indicates a URL of the single broadcasted program. Thus, the URLs included in the RSS can be different according to characteristics of the programs; therefore, setting periods of validity independently according to the respective characteristics is effective.

Next, updating the RSS feeds will be described more in detail. In the above description, the RSS feeds are updated periodically; however, the RSS feeds may be updated in the following updating process. That is, the information concerning updating the RSS feeds is provided to the URL of the RSS or to the RSS feeds so that the RSS manager 221 can update the RSS feeds based on the information. The information concerning updating the RSS feeds includes timing of updating the RSS feeds so that the RSS feeds are updated based on the timing.

The RSS feed or the URL of the RSS feed includes category information, which indicates a category of the information described in the RSS feed. With the category information, the RSS feed may be updated when the category information matches category information desired by the user. In other words, the RSS feed of which category information does not match is not updated.

Further, the RSS feed may be deleted when the category information of the obtained RSS does not match category information desired by the user.

Next, an updating/deleting process, which is executed based on viewed counts of a program, an RSS feed, a web page indicated by the RSS feed, will be described.

FIG. 19 is a flowchart to illustrate behaviors in the process. As shown in FIG. 19, first, time information, channel information, and EPG are compared to obtain a count L, indicating a number of times in which interrelated (e.g., a series of) programs have been viewed (ST1901). Next, a count M, indicating a number of times in which the RSS feed has been viewed, is obtained (ST1902). Further, a count N, indicating a number of times in which a web page represented by the URL included in the RSS feed has been viewed, is obtained (ST1903). Thereafter, sum S of the L, M, and N is obtained (ST1904). If the sum S is greater than a predetermined value V1 (ST1905: YES), the RSS feed is updated (ST1906). If the sum S is smaller than a predetermined value V2 (ST1907: YES), the RSS feed is deleted (ST1908). Generally, the predetermined value V1 is greater than or equal to the predetermined value V2. It is to be noted, in practice, the steps from ST1901 to ST1903 are executed in parallel with a normal operation, and each of the values is respectively stored in a hard disk, etc. The above-mentioned equations are merely examples, and the values can be respectively weighted.

In the above description, the RSS is advertising information, which may be delivered by an advertiser. The periods of validity for the items in the RSS and the URL indicating the location of the RSS may be set based on advertising fees paid by the advertiser.

In the above-described embodiment, the URL indicating the RSS is superimposed over the broadcasting signals; however, the contents of the RSS rather than the URL may be superimposed over the broadcasting signals. In this configuration, the step to access the URL indicating the RSS to obtain the RSS feed can be omitted.

Further, after the broadcasting station 100 transmits the URL indicating the RSS, the RSS manager 221 may detect a trigger to update the RSS and the URL indicating the RSS to be updated to obtain the RSS. A starting point of a program and a commercial message may be suitable for the trigger to update the RSS. Further, the RSS feed and/or the web contents may be obtained, stored, and displayed at a predetermined interval.

Furthermore, the RSS manager 221 may register a once-obtained address indicating the RSS and obtain the latest RSS to display according to a predetermined frequency or an updating instruction by the user. In other words, the operation to obtain the RSS feed can be performed at a predetermined frequency by registering an address of the RSS. For example, the RSS manager may detect an address indicating the RSS upon receipt of the broadcasting signals, display the address, and saves the address automatically to register. Thereafter, the latest feed corresponding to the address of the RSS may be obtained to be displayed upon activation of the RSS viewer. With the automatic registering configuration, the user can browse the information associated with the broadcasted programs without troublesome operations for the registration, and the latest information can be provided to the user. Thus, effective advertisement of the program can be expected.

Optionally, registration of the address of the RSS which was obtained along with the broadcasted program may be optionally set by the user. For example, following receipt of the broadcasting signals, detection of the address of the RSS, and displaying the list of the RSS, the address of the RSS selected by the user may be registered. Thereafter, the latest feed of the address of the RSS may be obtained to be displayed upon activation of the RSS reader.

In the above-described embodiment, a receiver system is configured with the television 210 and the set-top box 220; however, the television 210 may contain the functionality of the set-top box 220. In such a configuration, since the display unit 212 includes the BML browser, if the web browser 223 of the set-top box 220 can be replaced with the BML browser, the browsers may be reduced to one.

FIG. 20 is a diagram to illustrate a configuration of a digital broadcasting system according to another embodiment of the present invention. A configuration which is identical or similar to that shown in FIG. 1 is referred to by an identical reference sign, and otherwise redundant explanation of that will be omitted. In the present embodiment, a method to obtain the URL indicating the RSS differs from that in the previous embodiment, but the remaining configuration is similar to that in the previous embodiment. Therefore, the method to obtain the URL indicating the RSS will be described hereinbelow.

The broadcasting station 100*a*, unlike the broadcasting station 100, transmits the broadcasted program with the program attribute information superimposed thereon and without the URL indicating the RSS. An ISP (Internet Service Provider) server 500 is provided with a database 510, in which the program attribute information and the URL indicating the RSS of the web site associated with the program are associated. When the program attribute information is transmitted, the ISP server 500 returns the RSS of the web site associated with the program. An RSS manager 221*a*, unlike the RSS manager 221, has a function to transmit the program attribute information to the ISP server 500 and obtain URL of the RSS. The attribute information in the present embodiment is an aspect of information, e.g., a channel for the program and a title of the program, by which a program can be specified.

FIG. 21 is a flowchart to illustrate behaviors in the digital broadcasting system of the configuration shown in FIG. 20 to obtain web contents which are related to the program when the program is viewed.

First, the broadcasting station 100*a* broadcasts the broadcasting signals of the program with the superimposed attribute information which includes channel information of the program, and the television 210 receives the attribute information of the program along with the program (ST2101). The RSS manager 221*a* transmits the attribute information of the program to the ISP server 500 (ST2102). The ISP server 500 searches through the database 510 and returns a URL indicating the RSS which is associated with the attribute information of the program including the channel information. Thus, the RSS manager 221*a* obtains the URL indicating the RSS associated with the program (ST2103). Further, the RSS manager 221*a* accesses the obtained URL indicating the RSS, obtains and stores the RSS in the database 222, and displays the RSS on the monitor 213 (ST2104). Thereafter, the RSS manager 221*a* instructs the web browser 223 to obtain the web contents corresponding to the RSS selected by the user, and the web browser obtains the web contents at the URL corresponding to the RSS (ST2105). The obtained web contents are associated with the corresponding RSS to be stored in the database 222. The web browser 223 transmits the obtained web contents to the display unit 212 through the interface 221 of the set-top box 220 and the interface 214 of the television 210, and the obtained web contents are displayed on the monitor 213 (ST2106).

It is to be noted, in the configuration of the embodiment shown in FIG. 20, the hardware configuration of the set-top box 220 is similar to that shown in FIG. 3, and the configuration of the database 222 is similar to that shown in FIG. 7 or FIG. 12. Further, the screens to be displayed are similar to those shown in FIG. 5 or FIG. 6, and selection of the URL indicating the RSS is similarly performed to the operation shown in FIG. 8. Further, the expiring process is similarly conducted as those shown in FIG. 10 or FIG. 11. Furthermore, similarly to the above-described embodiment, the registration of the address of the RSS and the address of the RSS may be set to expire. Further, in ST2103, the ISP server 500 may return the RSS feed in addition to the URL indicating the RSS. With such a step, ST2104 can be omitted.

Additionally, updating and deleting the RSS can be similarly managed as the above embodiment.

Furthermore, in the embodiment shown in FIG. 20 and FIG. 21, the attribute information superimposed over the broadcasting signals of the program is transmitted to the ISP server 500; however, the information to be transmitted is not limited, and the channel information currently being detected by the set-top box and the time information may be transmitted to the ISP server 500.

Additionally, if the user subscribes to the ISP, an address table of the RSS, which is corresponded to the respective channels, may be downloaded and stored in the set-top box 220. In other words, when a channel 3 is tuned, an RSS address corresponding to the channel 3 is obtained from the downloaded table so that the RSS can be obtained. In this configuration, the ISP can provide its original service.

FIG. 22 is a flowchart to illustrate behaviors of the set-top box 220*a* and the television 210 when a program is recorded in the digital broadcasting system in the configuration shown in FIG. 20.

Steps ST2201-ST2203 in FIG. 22 are similar to ST2101-ST2103 in FIG. 21. When the RSS manager 221*a* obtains the RSS, the obtained RSS is stored in the database 222 (ST2204), and the process is terminated.

FIG. 23 is a diagram to illustrate a configuration of a program contents delivery system according to still another embodiment of the present invention. A configuration which is identical or similar to that shown in FIG. 1 is referred to by an identical reference sign, and otherwise redundant explanation of that will be omitted. A program provider server 600 is configured to provide program contents stored in a database 610 by means of streaming and downloading through the internet 300. Further, the program provider server 600 appends program attribute information which is related to a program and a URL of RSS which is related to the program to contents of the program to transmit. A program content receiver device 220b is provided with a plug-in player 226 for the web browser 223 to reproduce the contents of the program provided by the program provider server 600 and transmits the reproduced video and audio to the monitor 230 through the interface 224. The program content receiver device 220b is further provided with an RSS manager 221b, which detects the URL indicating the RSS in the program contents received through the internet 300, accesses the URL to obtain the RSS feed, and accesses the URL included in the RSS feed to instruct the web browser 223 to obtain the web contents.

Next, behaviors to obtain the RSS in the program contents delivery system according to the embodiment shown in FIG. 23 will be described.

FIG. 24 is a flowchart to illustrate behaviors of the contents delivery system shown in FIG. 23 according to the embodiment of the present invention.

First, the program provider appends the attribute information of the program contents and the URL of the associated RSS to the program contents to deliver (ST2401). That is, the RSS manager 221b in the program contents receiver device 220b in the residence 200 instructs the web browser 223 to access the URL which provides the program contents being provided by the program provider server 600. Thereafter, the delivered program contents are reproduced by the plug-in player 226 of the web browser 223, and audio signals are output to the monitor 230 through the interface 224. Thereafter, the RSS manager 221b detects the URL appended to the program contents and indicating the RSS (ST2403) and accesses the URL to obtain the corresponding RSS from the web server 400 (ST2403). The obtained RSS is displayed, and the user selects RSS of which web contents are desired to be obtained (ST2404). Next, the RSS manager 221b instructs the web browser 223 to access the URL corresponding to the contents of the RSS selected by the user, and the web browser 223 obtains the web contents (ST2405). The obtained web contents are displayed on a screen of the monitor 23 (ST2406).

It is to be noted, in the configuration of the embodiment shown in FIG. 23, the hardware configuration of database 222 and that shown in FIG. 7 or FIG. 12. Further, the screens to be displayed are similar to those shown in FIG. 5, FIG. 6, or FIG. 14, and selection of the URL indicating the RSS is similarly performed to the operation shown in FIG. 8. Further, the expiring process is similarly conducted as that shown in FIG. 16 or FIG. 17. However, a delivery period to deliver the program contents and the expiration period may be matched to each other. In this configuration, unnecessary data may be deleted to effectively utilize the database. Furthermore, similarly to the above-described embodiment, the registration of the address of the RSS and the address of the RSS may be set to expire. Further, in ST2401, the program provider server 600 may append the RSS feed in addition to the URL of the RS to the program contents to deliver.

Further, the obtained contents may be stored in the database 215 alternatively or additionally to displaying the contents obtained in ST2406.

When the delivered contents are stored in the database 215, firstly, upon reception of the program contents, the program contents are stored in the database 222b along with a program ID of the program. Next, downscaled images for thumbnails are generated based on the program content. Thereafter, the images for thumbnails are associated with the program ID, the program contents, the URL indicating the RSS, and the RSS feeds and stored in the database 222b.

FIG. 25 is a diagram to illustrate a data structure of the database 222b when the contents are stored. As shown, the images for thumbnails, the program contents, the URLs indicating the RSS, the RSS feeds, and the web contents indicated in the RSS feeds are associated to be stored in lower levels under the program ID. This data structure may be used when the contents are not stored but only viewed.

Next, behaviors to reproduce in the program contents receiver device 220b will be described.

The RSS manager 221b displays the RSS associated with the program and specifies the RSS selected by the user. Thereafter, the images for thumbnail display associated with the specified RSS are displayed. It is to be noted that the screen to be displayed on the monitor 213 is similar to that shown in FIG. 14.

Thereafter, when the user selects a thumbnail image, the RSS manager 221b instructs the plug-in player 226 to reproduce the program contents corresponding to the thumbnail image through the web browser 223. Thus, the program contents corresponding to the RSS can be selected based on views of the thumbnail images.

Next, streaming reproduction in the configuration shown in FIG. 23 will be described. In this configuration, the program provider server 600 transmits streaming signals of a program A, a URL of the server to stream-reproduce programs B, C, for example, and a URL of RSS including image data for thumbnail display, representing the programs B, C, along with the program contents. The receiver device 220b stream-reproduces to display on the screen S6 and accesses the web server 400 indicated by the transmitted URL to obtain the RSS stored in the database 410. The image data for thumbnail display, representing the program B and program C included in the RSS, is displayed on the screen S8 which is shown in FIG. 14. Thereafter, when, for example, the user selects the thumbnail image representing the program B, the receiver device 220b accesses the URL in which the program B is stream-reproduced so that the program B is stream-reproduced to be displayed on the screen S6. It is particularly convenient when the programs A, B, and C are in series, and the user wishes to view the program B after the program A is viewed.

Additionally, updating and deleting the RSS can be similarly managed as the above embodiments.

It is to be noted that the broadcasting stations 100, 100a in the embodiments shown in FIG. 1, FIG. 20, and FIG. 23 may broadcast by satellite and transmit radio waves through the satellites.

Further, in the above embodiments, the programs configured with video and audio for televisions have been described; however, the program may be configured solely with audio, i.e., a radio program. Furthermore, the receiver device may not necessarily limited to the television equipped in residences, but may be a portable receiver. Specifically, the program may be displayed on a screen of a mobile phone. Furthermore, the RSS itself may not necessarily be in text, but may be in audio or video.

Further, in the embodiments shown in FIG. 1 and FIG. 16, the attribute information of the program is superimposed over the broadcasting signals or delivered signals; however, the information may be obtained from EPG (Electronic Program Guide). Alternatively, the addresses of the RSS may be included in the specifying information to specify the program contents in the EPG Additionally, the RSS addresses may be detected, and the RSS may be obtained when the program contents are selected within the EPG. Alternatively, the RSS itself may be obtained from the EPG.

Further, the expiring process is similarly conducted as that shown in FIG. 17. However, a delivery period to deliver the program contents and the expiration period may be matched to each other. In this configuration, unnecessary data may be deleted to effectively utilize the database. Furthermore, similarly to the above-described embodiment, the registration of the address of the RSS and the address of the RSS may be set to expire. Further, the program provider server 600 may append the RSS feed in addition to the URL of 28 television 210, but may be transmitted from the broadcasting station or the program provider server.

The URL of the RSS associated with the program contents and the RSS feeds may be deleted when the program contents are deleted so that the RSS can be managed easily by the user.

It is to be noted that the broadcasting stations 100, 100a in the embodiments shown in FIG. 1, FIG. 20 may broadcast by satellite and transmit radio waves through the satellites.

Further, in the above embodiments, the programs configured with video and audio for televisions have been described; however, the program may be configured solely with audio, i.e., a radio program. Furthermore, the receiver device may not necessarily limited to the television equipped in residences, but may be a portable receiver. Specifically, the program may be displayed on a screen of a mobile phone. Furthermore, the RSS itself may not necessarily be in text, but may be in audio or video.

Furthermore, the summarized information may be represented in an ATOM format in place of the RSS.

In the above embodiments, the RSS feeds and the web contents are associated with each other to be stored in the database 222, as shown in FIG. 12; however, the RSS feeds and the web contents may be subsequently deleted, for example, based on the expiration settings. Additionally, the RSS feeds and the web contents may be deleted based on the expiration settings or detection of a small volume of remaining memory in the database 222. Optionally, the addresses of the RSS may be maintained to remain even when the RSS feeds are deleted.

In the above embodiments of the present invention, the web contents described in HTML have been described; however, the contents may be described in different markup languages such as BML. In such cases, the browser is required to have a feature to analyze and display the web contents.

Further, in the above embodiments of the present invention, the ISP server is not limited to the ISP in a narrow sense, but may be a server to administrate the web contents described in HTML, BML, and so on.

Furthermore, the images for thumbnails may not be still images, but may be motion images which repeats certain movements in every few seconds. The images for thumbnails may not necessarily be downscaled images as long as the images can be displayed on the screen. Further, the images for thumbnails may not necessarily be generated in the television 210, but may be transmitted from the broadcasting station or the program provider server.

Further, in the above embodiments, the attribute information of the program is superimposed over the broadcasting signals or delivered signals; however, the information may be obtained from EPG (Electronic Program Guide). Alternatively, the addresses of the RSS may be included in the specifying information to specify the program contents in the EPG. Additionally, the RSS addresses may be detected, and the RSS may be obtained when the program contents are selected within the EPG Alternatively, the RSS itself may be obtained from the EPG.

FIG. 26 is a diagram to illustrate screens to be displayed when the RSS is included in program information of the EPG.

In FIG. 26, a screen S9 represents a screen in which a schedule listing of the EPG is shown, and a screen S10 represents a screen with RSS of a program to be displayed, when the user clicks to select the program within the schedule listing of the EPG. A screen S11 represents a screen to display a broadcasted program or a web page corresponding to a URL included in the RSS.

As shown in FIG. 26, the EPG obtained from the internet, and the like, is displayed on the screen S9. The EPG includes the RSS, and when the user clicks on a portion of a program P1 to be recorded, the RSS associated with the program is obtained. Thereafter, the contents of the RSS are displayed in a list or in a ticker on the screen S10. Thereafter, the content part (e.g., "abcdefg") of the displayed RSS is selected and clicked on, the web page corresponding to the contents of the RSS is displayed on the screen S11. It is to be noted that the screen S11 may be used not only to display the web page but also to display the program.

In FIG. 26, all of the screens are displayed on the screen of the monitor; however, some of the screens may be displayed on a display of a remote controller, which is used to switch channels of the television.

It is to be noted, if the program selected within the EPG has already been broadcasted, the instructions to browse or record the program cannot be provided through the EPG. In such a case, the availability of the program is judged based on the current time, and even when the program was broadcasted, the RSS may be configured to be available. For example, when the program is rerun in stream-reproduction, and if the URL is included in the RSS, the URL may be accessed easily during the rerun of the program in stream-reproduction.

FIG. 27 is a diagram to illustrate an external view of such a remote controller 800. In FIG. 27, notation 810 indicates a liquid crystal display, which is divided by a screen 811 to display the schedule listing of the EPG and a screen 812 to display the contents of the corresponding RSS. The web pages and the programs are displayed on the entire monitor 213 of the television 210. With such a configuration, selection of a program to be recorded can be made in the remote controller 800 at hand, and the current program or the information of the web pages can be displayed on the larger screen so that, when the television is viewed by a plurality of persons, the others can view the larger screen without disturbance. Notation 820 indicates cursor keys, which are used to shift a cursor to select the contents of the EPG and RSS displayed on the screens 811, 812, and the selection is entered through a select button 821.

Further, a screen similar to the screens 811, 812 as shown in FIG. 27 may be displayed on a display of a mobile phone, which is capable of communicating in infrared or Bluetooth radio waves, so that the television channels can be selected in a similar manner to the remote controller. Furthermore, the mobile phone may communicate with the television 210 through the internet 10 to access a home server, which is connected to the television 210. Moreover, the communication may be available through a LAN (Local Area Network) within the residence.

Additionally, updating, deleting, and displaying the obtained RSS can be managed as describe above with reference to FIG. 9, FIG. 12, and FIG. 13.

In the above embodiments, the RSS feeds and the web contents are associated with each other to be stored in the database 222, as shown in FIG. 7; however, the RSS feeds and the web contents may be subsequently deleted, for example, based on the expiration settings. Additionally, the RSS feeds and the web contents may be deleted based on the expiration settings or detection of a small volume of remaining memory in the database 222. Optionally, the addresses of the RSS may be maintained to remain even when the RSS feeds are deleted.

In the above embodiments of the present invention, the web contents described in HTML have been described; however, the contents may be described in different markup languages such as BML. In such cases, the browser is required to have a feature to analyze and display the web contents. The summarized information may be represented in an ATOM format in place of the RSS. Further, in the above embodiments of the present invention, the ISP server is not limited to the ISP in a narrow sense, but may be a server to administrate the web contents described in HTML, BML, and so on.

Furthermore, the television 210 in the above embodiments as shown in FIG. 1 or FIG. 20 may be replaced with an HD recorder 210c having an external monitor 213c and the components included in the television 210 but excluding the monitor 213, as shown in FIG. 28. FIG. 29 is a block diagram to illustrate an internal configuration of the HD recorder 210c. The external monitor 213c is connected to the display unit 212 of the HD recorder 210c through the interface 234. The remaining configuration in the HD recorder 210c is similar to the configuration of the television 210 shown in FIG. 2.

According to some aspects of the present invention, the management information may be included in summarized information which is received along with the program signals. Further, the summarized information obtaining unit may extract a summarized information address, which indicates a location of the summarized information being transmitted along with the program signals, and the management information and may access the summarized information address to obtain the summarized information.

According to some aspects of the present invention, the summarized information managing device may further include a summarized information management unit, which manages the summarized information obtained by the summarized information obtaining unit based on at least one of a viewership achievement of an associated program associated with the program, a browsed achievement of the summarized information, and a browsed achievement of a web page at the address included in the summarized information.

According to some aspects of the present invention, the summarized information management unit may update, delete, and display the summarized information according to the management information. Further, the summarized information may be represented in RSS, and the management information may include the period of validity concerning accessibility to at least one of an address of a channel component and an address of an itemizing component of the RSS.

According to some aspects of the present invention, a step to extract and obtain summarized information address, which indicates a location of the summarized information superimposed over the received program signals, from the program signals, may be included. Further, the step to obtain the summarized information may include a step to access the obtained summarized information address to obtain the summarized information.

According to some aspects of the present invention, a step to obtain summarized information address, which indicates a location of the summarized information, may be included. The step to obtain the program specifying information may include a step to extract and obtain the program specifying information superimposed over the received program signals from the program signals. The step to obtain the summarized information address may include a step to transmit the program specifying information to a database, in which the program specifying information and the summarized information are stored to be associated with each other, and to obtain the summarized information address which indicates the summarized information corresponding to the program specifying information.

According to some aspects of the present invention, the step to obtain the program specifying information may include a step to generate the program specifying information based on the received program signals.

According to some aspects of the present invention, the step to obtain the program specifying information may include a step to extract and obtain the program specifying information superimposed over the received program signals from the program signals.

According to some aspects of the present invention, the step to display the summarized information and the program specifying information which is associated with the summarized information on a screen may include a step to display the program specifying information which is associated with a piece of summarized information selected by a user among a plurality of pieces of summarized information.

According to some aspects of the present invention, the program specifying information may include at least one of a partial image of the program signals and attribute information concerning the program signals.

According to some aspects of the present invention, a step to delete the summarized information associated with the program signals and the program specifying information, when the recorded program signals are deleted, may be included.

According to some aspects of the present invention, the summarized information may be provided with a storage period, and a step to delete the summarized information, in which the provided storage period is expired, from the storage unit, may be included.

According to some aspects of the present invention, a step to access a selected address among addresses of the web contents included in the obtained summarized information to obtain the web contents may be included, and a step to record the obtained web contents, the obtained, program specifying information, the obtained summarized information, and the received program signals to be associated with one another, may be included.

According to some aspects of the present invention, the program signals may be either ones of broadcasted broadcasting signals and downloaded program content signals.

What is claimed is:

1. A summarized information managing device, comprising:
   a program signal receiver unit to receive program signals which provide a program;
   a summarized information obtaining unit to obtain summarized information, which at least includes a URL concerning web contents being associated with the program and is written in a markup language, along with management information of the summarized information; and
   a summarized information management unit to manage the summarized information obtained by the summarized information obtaining unit according to the management information,
   wherein the management information includes at least one of periods of validities concerning obtaining the summarized information, displaying the summarized information, a category of the summarized information, and accessibility to an address included in the summarized information, wherein the management information is included in summarized information which is received along with the program signals, wherein the summarized information obtaining unit is further configured to extract a summarized information address, which indicates a location of the summarized information being transmitted along with the program signals, and the management information and automatically and periodically accesses the summarized information address at a predetermined interval to obtain the summarized information, and wherein the summarized information management unit is further configured to automatically cause a display of at least a portion of the summarized information during a display of the program according to the management information, without requiring that a user provide instructions to display the summarized information.

2. The summarized information managing device according to claim 1, wherein the summarized information management unit includes a managing function to manage the summarized information, obtained by the summarized information obtaining unit, based on at least one of a viewership achievement of an associated program associated with the program, a browsed achievement of the summarized information, and a browsed achievement of a web page at the address included in the summarized information.

3. The summarized information managing device according to claim 2, wherein the summarized information management unit updates and deletes the summarized information according to the management information.

4. The summarized information managing device according to claim 1, wherein the summarized information is represented in resource description framework site summary format (RSS); and wherein the management information includes the period of validity concerning accessibility to at least one of an address of a channel component and an address of an itemizing component of the RSS.

5. A computer-implemented method to manage summarized information, comprising receiving, by one or more processors, program signals which provide a program;

obtaining, by at least one of the one or more processors, summarized information of web contents which are associated with the program along with management information of the summarized information;

managing, by at least one of the one or more processors, the summarized information according to the management information, wherein the management information includes at least one of periods of validities concerning obtaining the summarized information, displaying the summarized information, a category of the summarized information, and accessibility to an address included in the summarized information; and automatically displaying, on a screen, at least a portion of the summarized information during a display of the program according to the management information, without requiring that a user provide instructions to display the summarized information.

6. The method to manage summarized information according to claim 5, wherein the program signals are either ones of broadcasted broadcasting signals and downloaded program content signals.

7. A program list information-using device, comprising:

a program signal receiver unit comprising one or more processors and a signal receiver configured to receive program signals which provide a program;

a program list information obtaining unit comprising one or more processors configured to obtain program list information, wherein the program list information:

is written in a markup language, is usable to view or record a program, and at least includes a URL of web contents associated with the program and summarized information associated with the program;

a summarized information obtaining unit comprising one or more processors configured to:

obtain the summarized information included in the program list information, when the program list information, obtained by the program list information obtaining unit, is used to select the program to be viewed or recorded, extract a summarized information address, which indicates a location of the summarized information associated with the program, and access the summarized information address to obtain the summarized information; and a display unit to automatically cause a display of at least a portion of the summarized information during a display of the program on a screen, without requiring that a user provide instructions to display the summarized information.

8. A computer-implemented method to use program list information, comprising:

receiving, by one or more processors, from a program signal transmitter, program signals which provide a program;

obtaining, by at least one of the one or more processors, from the program signals, program list information, wherein the program list information:

is written in a markup language, is usable to view or record a program, and at least includes a URL of web contents associated with the program and summarized information associated with the program;

obtaining, by at least one of the one or more processors, the summarized information included in the program list information when the program to be viewed or recorded is selected based on the obtained program list information;

extracting, by at least one of the one or more processors, a summarized information address, which indicates a location of the summarized information associated with the program;

accessing, by at least one of the one or more processors, the summarized information address to obtain the summarized information; and automatically displaying the at least a portion of summarized information during a display of the program on a screen, without requiring that a user provide instructions to display the summarized information.

9. The method to use the program list information according to claim 8,
wherein program signals which provides the program are either ones of broadcasted broadcasting signals and downloaded program content signals.

10. A program signal exchanging system, comprising:
a program signal transmitter device comprising one or more processors and a signal transmitter configured to transmit program signals to provide a program; and
a program signal receiver device comprising one or more processors and a signal receiver configured to:
receive, from the program signal transmitter device, the program signals which provide the program and summarized information associated with the program,
obtain summarized information, from the program signal transmitter device, which at least includes a URL concerning web contents associated with the program and is written in a markup language, along with management information of the summarized information; and
manage the obtained summarized information according to the management information,
wherein the management information includes at least one of periods of validities concerning obtaining the summarized information, displaying the summarized information, a category of the summarized information, and accessibility to an address included in the summarized information,
wherein the management information is included in summarized information which is received along with the program signals,
wherein the program signal receiver device is further configured to extract a summarized information address, which indicates a location of the summarized information being transmitted along with the program signals, and the management information and automatically and periodically accesses the summarized information address at a predetermined interval to obtain the summarized information, and
wherein the program signal receiver device is further configured to automatically cause a display of at least a portion of the summarized information during a display of the program according to the management information, without requiring that a user provide instructions to display the summarized information.

11. A computer-implemented method to record and reproduce program signals, comprising:
receiving, by one or more processors, program signals which provide a program;
obtaining, by at least one of the one or more processors, summarized information, which at least includes a URL concerning web contents being associated with the program and is written in a markup language;
obtaining, by at least one of the one or more processors, program specifying information to specify the program;
recording, by at least one of the one or more processors, the obtained program specifying information to be associated with the obtained summarized information and the received program signals;
automatically displaying at least a portion of the program specifying information associated with the summarized information on a screen, without requiring that a user provide instructions to display the summarized information;
extracting, by at least one of the one or more processors, the program signals specified by the program specifying information, when the user selects the program specifying information, from a record created in the recording step, and reproduce the extracted program signals;
extracting and obtaining, by at least one of the one or more processors, summarized information address, which indicates a location of the summarized information superimposed over the received program signals, from the program signals; and
displaying at least a portion of the summarized information on the screen;
wherein obtaining the summarized information includes automatically and periodically accessing the obtained summarized information address to obtain the summarized information at a predetermined period.

12. The method to record and reproduce the program signals according to claim 11,
wherein the obtaining the program specifying information includes extracting and obtaining the program specifying information superimposed over the received program signals from the program signals; and
wherein obtaining the summarized information address includes transmitting the program specifying information to a database, in which the program specifying information and the summarized information are stored to be associated with each other, and to obtain the summarized information address which indicates the summarized information corresponding to the program specifying information.

13. The method to record and reproduce the program signals according to claim 11,
wherein obtaining the program specifying information includes generating the program specifying information based on the received program signals.

14. The method to record and reproduce the program signals according to claim 11,
wherein obtaining the program specifying information includes extracting and obtaining the program specifying information superimposed over the received program signals from the program signals.

15. The method to record and reproduce the program signals according to claim 11,
wherein displaying the summarized information and the program specifying information which is associated with the summarized information on a screen includes displaying the program specifying information which is associated with a piece of summarized information selected by a user among a plurality of pieces of summarized information.

16. The method to record and reproduce the program signals according to claim 11,
wherein the program specifying information includes at least one of a partial image of the program signals and attribute information concerning the program signals.

17. The method to record and reproduce the program signals according to claim 11, further comprising deleting the summarized information associated with the program signals and the program specifying information when the recorded program signals are deleted.

18. The method to record and reproduce the program signals according to claim 11,
wherein the summarized information is provided with a storage period; and
wherein the method further includes deleting the summarized information, in which the provided storage period is expired, from the record.

19. The method to record and reproduce the program signals according to claim 11, further comprising:
accessing a selected address among addresses of the web contents included in the obtained summarized information to obtain the web contents; and
recording the obtained web contents, the obtained program specifying information, the obtained summarized information, and the received program signals to be associated with one another.

20. The method to record and reproduce the program signals according to claim 11,
wherein the program signals are either ones of broadcasted broadcasting signals and downloaded program content signals.

21. A recording and reproducing device for program signals, comprising:
a program signal receiver unit to receive program signals which provide a program;
a summarized information obtaining unit to obtain summarized information, which at least includes a URL concerning web contents being associated with the program and is written in a markup language;
a program specifying information obtaining unit to obtain program specifying information which specifies the program;
a recording unit to record the program specifying information obtained by the program specifying information obtaining unit to be associated with the summarized information obtained by the summarized information obtaining unit and the program signals received by the program signal receiver unit;
a display unit to automatically cause a display of at least a portion of the program specifying information associated with the summarized information on a screen, without requiring that a user provide instructions to display the summarized information;
a program signal reproduction unit to extract the program signals specified by the program specifying information, when the user selects the program specifying information, from the recording unit and reproduce the extracted program signals; and
the display unit is further configured to cause a display of at least a portion of the summarized information on the screen.

22. The recording and reproducing device for program signals according to claim 21,
wherein the program signals are either ones of broadcasted broadcasting signals and downloaded program content signals.

23. A recording and reproducing device for program signals, comprising:
a program signal receiver unit to receive program signals, on which summarized information address indicating an address of summarized information concerning web contents being associated with a program and written in a markup language is superimposed;
a summarized information address extracting unit to extract the summarized information address from the received program signals;
a summarized information obtaining unit to automatically and periodically access the extracted summarized information address to obtain the summarized information at a predetermined interval;
a program specifying information obtaining unit to obtain program specifying information which specifies the program;
a recording unit to record the obtained program specifying information to be associated with the obtained summarized information and the received program signals;
a display unit to automatically cause a display of at least a portion of the program specifying information associated with the summarized information on a screen, without requiring that a user provide instructions to display the summarized information;
a program signal reproduction unit to extract the program signals specified by the program specifying information, when the user selects the program specifying information, from the recording unit and reproduce the extracted program signals; and
the display unit is further configured to cause a display of at least a portion of the summarized information.

24. The recording and reproducing device for program signals according to claim 23,
wherein the program signals are either ones of broadcasted broadcasting signals and downloaded program content signals.

25. A recording and reproducing device for program signals, comprising:
a program signal receiver unit to receive program signals, on which attribute information concerning the program is superimposed;
an attribute information extracting unit to extract the attribute information from the received program signals;
a summarized information address obtaining unit to transmit the extracted attribute information to a database, in which the attribute information of the program and an address of the summarized information written in a markup language and concerning web contents being associated with the program are stored to be associated with each other, and to obtain the summarized information address which indicates an address of the summarized information corresponding to the transmitted attribute information;
a summarized information obtaining unit to automatically and periodically access the obtained summarized information address to obtain the summarized information at a predetermined interval;
a summarized information displaying unit to display the obtained summarized information;
a program specifying information obtaining unit to obtain program specifying information which specifies the program;
a recording unit to record the obtained program specifying information to be associated with the obtained summarized information and the received program signals;
a display unit to automatically cause the display of at least a portion of the program specifying information associated with the summarized information on a screen during a display of the program, without requiring that a user provide instructions to display the summarized information;
a program signal reproduction unit to extract the program signals specified by the program specifying information, when the user selects the program specifying information, from the recording unit and reproduce the extracted program signals; and
the display unit is further configured to cause a display of at least a portion of the summarized information.

26. The recording and reproducing device for program signals according to claim 25,
wherein the program signals are either ones of broadcasted broadcasting signals and downloaded program content signals.

27. A computer-implemented method to reproduce streaming program signals, comprising:
- receiving, by one or more processors, streaming program signals which provide a program in stream;
- obtaining, by at least one of the one or more processors, summarized information, which is written in a markup language and in which an address to provide program signals of another program being related to the program is stored;
- obtaining, by at least one of the one or more processors, program specifying information to specify the program;
- automatically displaying at least a portion of the obtained program specifying information on a screen during a display of the program, without requiring that a user provide instructions to display the summarized information; and
- accessing, by at least one of the one or more processors, an address which provides streaming program signals of a program specified by the program specifying information based on the obtained summarized information, when the user selects the program specifying information, to reproduce the streaming program signals.

28. A receiver device for program signals, comprising:
- a program signal receiver unit to receive program signals, on which summarized information address indicating an address of summarized information, written in a markup language and at least including a URL of web contents concerning a program is superimposed;
- a summarized information address extracting unit to extract the summarized information address from the received program signals;
- a summarized information obtaining unit to automatically and periodically access the extracted summarized information address to obtain the summarized information at a predetermined interval;
- a summarized information display unit to automatically cause the display of at least a portion of the obtained summarized information during a display of the program, without requiring that a user provide instructions to display the summarized information; and
- a summarized information management unit, which manages the summarized information obtained by the summarized information obtaining unit based on at least one of a viewership achievement of an associated program associated with the program, a browsed achievement of the summarized information, and a browsed achievement of a web page at the address included in the summarized information.

29. The receiver device for program signals according to claim 28,
- wherein the program signals are either ones of broadcasted broadcasting signals and downloaded program content signals.

30. A receiver device for program signals, comprising:
- a program signal receiver unit to receive program signals, on which attribute information concerning the program is superimposed;
- an attribute information extracting unit to extract the attribute information from the received program signals;
- a summarized information address obtaining unit to transmit the extracted attribute information to a database, in which the attribute information of the program and an address of the summarized information written in a markup language and concerning web contents being associated with the program are stored to be associated with each other, and to obtain the summarized information address which indicates an address of the summarized information corresponding to the transmitted attribute information;
- a summarized information obtaining unit to automatically and periodically access the obtained summarized information address to obtain the summarized information at a predetermined interval;
- a summarized information displaying unit to automatically cause the display of at least a portion of the obtained summarized information during a display of the program, without requiring that a user provide instructions to display the summarized information; and
- a summarized information management unit, which manages the summarized information obtained by the summarized information obtaining unit based on at least one of a viewership achievement of an associated program associated with the program, a browsed achievement of the summarized information, and a browsed achievement of a web page at the address included in the summarized information.

31. The receiver device for program signals according to claim 30, wherein the program signals are either ones of broadcasted broadcasting signals and downloaded program content signals.

32. A reproduction device for streaming program signals, comprising:
- a streaming program signal receiver unit to receive streaming program signals which provide a program in stream;
- a summarized information obtaining unit to automatically and periodically access a summarized information address, which indicates a location of summarized information, to obtain the summarized information, in which an address to provide program signals of another program being related to the program is stored, the summarized information written in a markup language and at least including a URL concerning web contents being associated with the program;
- a summarized information address extracting unit to extract the summarized information address, which is superimposed over the received streaming program signals, from the streaming program signals;
- a program specifying information obtaining unit to obtain program specifying information to specify the program;
- a display unit to automatically cause the display of at least a portion of the obtained program specifying information on a screen during a display of the program, without requiring that a user provide instructions to display the summarized information; and
- a reproduction unit to access an address which provides streaming program signals of a program specified by the program specifying information based on the summarized information obtained by the summarized information obtaining unit, when the user selects the program specifying information, to reproduce the specified streaming program signals.

33. A reproduction device for streaming program signals, comprising:
- a streaming program signal receiver unit to receive streaming program signals which provide a program in stream;
- a program specifying information extracting unit to extract program specifying information, which specifies the program and is superimposed over the streaming program signals, from the streaming program signals;
- a summarized information address obtaining unit to transmit the extracted program specifying information to a database, in which the program specifying information and an address of summarized information concerning web contents being associated with the program are stored to be associated with each other, and to obtain the summarized information address which indicates an address of the summarized information corresponding to the transmitted program specifying information;

a summarized information obtaining unit to automatically and periodically access the obtained summarized information address to obtain the summarized information at a predetermined interval;

a display unit to automatically cause the display of at least a portion of the extracted program specifying information on a screen during a display of the program, without requiring that a user provide instructions to display the summarized information; and a reproduction unit to access an address which provides streaming program signals of a program specified by the program specifying information based on the obtained summarized information, when the user selects the program specifying information being displayed, to reproduce the specified streaming program signals.

* * * * *